United States Patent
Eguchi et al.

(10) Patent No.: US 7,729,025 B2
(45) Date of Patent: Jun. 1, 2010

(54) COLOR IMAGE COMPRESSING METHOD AND DEVICE

(75) Inventors: Shinichi Eguchi, Tokyo (JP); Kouichi Kanamoto, Tokyo (JP); Naoko Suzuki, Tokyo (JP); Yutaka Katsumata, Tokyo (JP)

(73) Assignees: Fujitsu Limited, Kawasaki (JP); Fujitsu Frontech Limited, Inagi-shi (JP)

( * ) Notice: Subject to any disclaimer, the term of this patent is extended or adjusted under 35 U.S.C. 154(b) by 1232 days.

(21) Appl. No.: 10/881,524

(22) Filed: Jul. 1, 2004

(65) Prior Publication Data

US 2005/0100212 A1   May 12, 2005

(30) Foreign Application Priority Data

Nov. 11, 2003  (JP) .............................. 2003-381727

(51) Int. Cl.
*H04N 1/46* (2006.01)
*H04N 1/60* (2006.01)
*G06F 15/00* (2006.01)
*G06K 1/00* (2006.01)

(52) U.S. Cl. ........................................ 358/539; 358/1.9
(58) Field of Classification Search ................. 358/539, 358/464, 522; 382/164, 202, 176, 170, 171, 382/242, 195, 190, 224, 173, 168
See application file for complete search history.

(56) References Cited

U.S. PATENT DOCUMENTS 5,353,132 A * 10/1994 Katsuma ..................... 358/539
6,404,919 B1 * 6/2002 Nishigaki et al. ........... 382/176
6,434,270 B1 * 8/2002 Ohara et al. ................. 382/178
6,707,939 B1    3/2004 Weinholz et al. ............ 382/164

(Continued)

FOREIGN PATENT DOCUMENTS

EP    1 014 699 A1    6/2000

(Continued)

OTHER PUBLICATIONS

Gonzalez et. al, Digital Image Processing, 2002, Prentice Hall, Second Edition, p. 644-645.*

(Continued)

*Primary Examiner*—Douglas Q Tran
(74) *Attorney, Agent, or Firm*—Kratz, Quintos & Hanson, LLP

(57) ABSTRACT

It is an object of the present invention to improve the compression ratio of a color image and to clearly display the outlines of characters and the like. A hue cluster classifying/unifying unit reduces the number of hue values of each pixel in a color image, based on a hue histogram, allocates the number-reduced hue value to each pixel and classifies pixels with the same hue value into one cluster. Furthermore, the unit unifies clusters whose hue values are below a predetermined value. The unit also traces the outline of a cluster whose size is below a reference value and determines that a cluster that has a lot of change points belongs to a character area. An encoding unit determines the characteristic of each cluster, based on both an area determined by an area determining unit and whether the cluster belongs to a ruled line area or a character area, and encodes pixels in each cluster by a coding method suitable for the characteristic of the cluster.

11 Claims, 22 Drawing Sheets

U.S. PATENT DOCUMENTS 6,748,108 B2 * 6/2004 Klassen ...................... 382/166
6,757,427 B1 * 6/2004 Hongu ....................... 382/164

FOREIGN PATENT DOCUMENTS

| EP | 1 079 599 | 2/2001 |
| EP | 1 079 599 A2 | 2/2001 |
| JP | 1-198866 | 8/1989 |
| JP | 2-1076 | 1/1990 |
| JP | 8-16793 | 1/1996 |
| JP | 8-279913 | 10/1996 |
| JP | 8-298589 | 11/1996 |
| JP | 2001-61062 | 3/2001 |
| JP | 2001-143074 | 5/2001 |
| JP | 2002-218500 | 8/2002 |
| WO | WO 99/55075 | 10/1999 |

OTHER PUBLICATIONS

Search Report dated Nov. 23, 2004.
Chinese Office Action mailed Jul. 27, 2007 with English translation (7 pages).
Office Action dated Feb. 9, 2007 for the corresponding Chinese application and English translation thereof.
Notice of Rejection Grounds dated Oct. 11, 2007 w/English translation.
United Kingdom Office Communication dated Jul. 29, 2008.

* cited by examiner

31

| Distributed Amount of Color Values \ Distributed Amount of Hue | SMALL | LARGE |
|---|---|---|
| SMALL | BACKGROUND AREA | |
| LARGE | RULED LINE/CHARACTER AREA | PHOTOGRAPH AREA |

| LUM | +0 | +16 | +32 | +48 | +64 | +80 | +96 | +112 | +128 | +144 | +160 | +176 | +192 | +208 | +224 | +240 |
|---|---|---|---|---|---|---|---|---|---|---|---|---|---|---|---|---|
| 0 | 26 | 24 | 22 | 21 | 19 | 18 | 16 | 15 | 14 | 13 | 12 | 12 | 11 | 11 | 10 | 10 |
| 1 | 26 | 24 | 22 | 21 | 19 | 18 | 16 | 15 | 14 | 13 | 12 | 12 | 11 | 11 | 10 | 10 |
| 2 | 26 | 24 | 22 | 21 | 19 | 17 | 16 | 15 | 14 | 13 | 12 | 11 | 11 | 11 | 10 | 10 |
| 3 | 26 | 24 | 22 | 20 | 19 | 17 | 16 | 15 | 14 | 13 | 12 | 11 | 11 | 10 | 10 | 10 |
| 4 | 26 | 24 | 22 | 20 | 19 | 17 | 16 | 15 | 14 | 13 | 12 | 11 | 11 | 10 | 10 | 10 |
| 5 | 26 | 24 | 22 | 20 | 19 | 17 | 16 | 15 | 14 | 13 | 12 | 11 | 11 | 10 | 10 | 10 |
| 6 | 26 | 24 | 22 | 20 | 19 | 17 | 16 | 15 | 14 | 13 | 12 | 11 | 11 | 10 | 10 | 10 |
| 7 | 25 | 23 | 22 | 20 | 18 | 17 | 16 | 15 | 14 | 13 | 12 | 11 | 11 | 10 | 10 | 10 |
| 8 | 25 | 23 | 22 | 20 | 18 | 17 | 16 | 15 | 14 | 13 | 12 | 11 | 11 | 10 | 10 | 10 |
| 9 | 25 | 23 | 21 | 20 | 18 | 17 | 16 | 14 | 13 | 13 | 12 | 11 | 11 | 10 | 10 | 10 |
| 10 | 25 | 23 | 21 | 20 | 18 | 17 | 16 | 14 | 13 | 13 | 12 | 11 | 11 | 10 | 10 | 10 |
| 11 | 25 | 23 | 21 | 20 | 18 | 17 | 15 | 14 | 13 | 13 | 12 | 11 | 11 | 10 | 10 | 10 |
| 12 | 25 | 23 | 21 | 20 | 18 | 17 | 15 | 14 | 13 | 12 | 12 | 11 | 11 | 10 | 10 | 10 |
| 13 | 25 | 23 | 21 | 19 | 18 | 17 | 15 | 14 | 13 | 12 | 12 | 11 | 11 | 10 | 10 | 10 |
| 14 | 25 | 23 | 21 | 19 | 18 | 16 | 15 | 14 | 13 | 12 | 12 | 11 | 11 | 10 | 10 | 10 |
| 15 | 24 | 23 | 21 | 19 | 18 | 16 | 15 | 14 | 13 | 12 | 12 | 11 | 11 | 10 | 10 | 10 |

| LUM | +0 | +16 | +32 | +48 | +64 | +80 | +96 | +112 | +128 | +144 | +160 | +176 | +192 | +208 | +224 | +240 |
|---|---|---|---|---|---|---|---|---|---|---|---|---|---|---|---|---|
| 0 | 13 | 12 | 11 | 10 | 10 | 9 | 8 | 8 | 7 | 7 | 6 | 6 | 5 | 5 | 5 | 5 |
| 1 | 13 | 12 | 11 | 10 | 10 | 9 | 8 | 8 | 7 | 7 | 6 | 6 | 5 | 5 | 5 | 5 |
| 2 | 13 | 12 | 11 | 10 | 9 | 9 | 8 | 7 | 7 | 6 | 6 | 6 | 5 | 5 | 5 | 5 |
| 3 | 13 | 12 | 11 | 10 | 9 | 9 | 8 | 7 | 7 | 6 | 6 | 6 | 5 | 5 | 5 | 5 |
| 4 | 13 | 12 | 11 | 10 | 9 | 9 | 8 | 7 | 7 | 6 | 6 | 6 | 5 | 5 | 5 | 5 |
| 5 | 13 | 12 | 11 | 10 | 9 | 9 | 8 | 7 | 7 | 6 | 6 | 6 | 5 | 5 | 5 | 5 |
| 6 | 13 | 12 | 11 | 10 | 9 | 9 | 8 | 7 | 7 | 6 | 6 | 6 | 5 | 5 | 5 | 5 |
| 7 | 13 | 12 | 11 | 10 | 9 | 9 | 8 | 7 | 7 | 6 | 6 | 6 | 5 | 5 | 5 | 5 |
| 8 | 13 | 12 | 11 | 10 | 9 | 8 | 8 | 7 | 7 | 6 | 6 | 6 | 5 | 5 | 5 | 5 |
| 9 | 13 | 12 | 11 | 10 | 9 | 8 | 8 | 7 | 7 | 6 | 6 | 6 | 5 | 5 | 5 | 5 |
| 10 | 13 | 12 | 11 | 10 | 9 | 8 | 8 | 7 | 7 | 6 | 6 | 6 | 5 | 5 | 5 | 5 |
| 11 | 12 | 11 | 11 | 10 | 9 | 8 | 8 | 7 | 7 | 6 | 6 | 6 | 5 | 5 | 5 | 5 |
| 12 | 12 | 11 | 11 | 10 | 9 | 8 | 8 | 7 | 7 | 6 | 6 | 6 | 5 | 5 | 5 | 5 |
| 13 | 12 | 11 | 11 | 10 | 9 | 8 | 8 | 7 | 7 | 6 | 6 | 6 | 5 | 5 | 5 | 5 |
| 14 | 12 | 11 | 10 | 10 | 9 | 8 | 8 | 7 | 7 | 6 | 6 | 6 | 5 | 5 | 5 | 5 |
| 15 | 12 | 11 | 10 | 10 | 9 | 8 | 8 | 7 | 7 | 6 | 6 | 6 | 5 | 5 | 5 | 5 |

F I G. 7 B

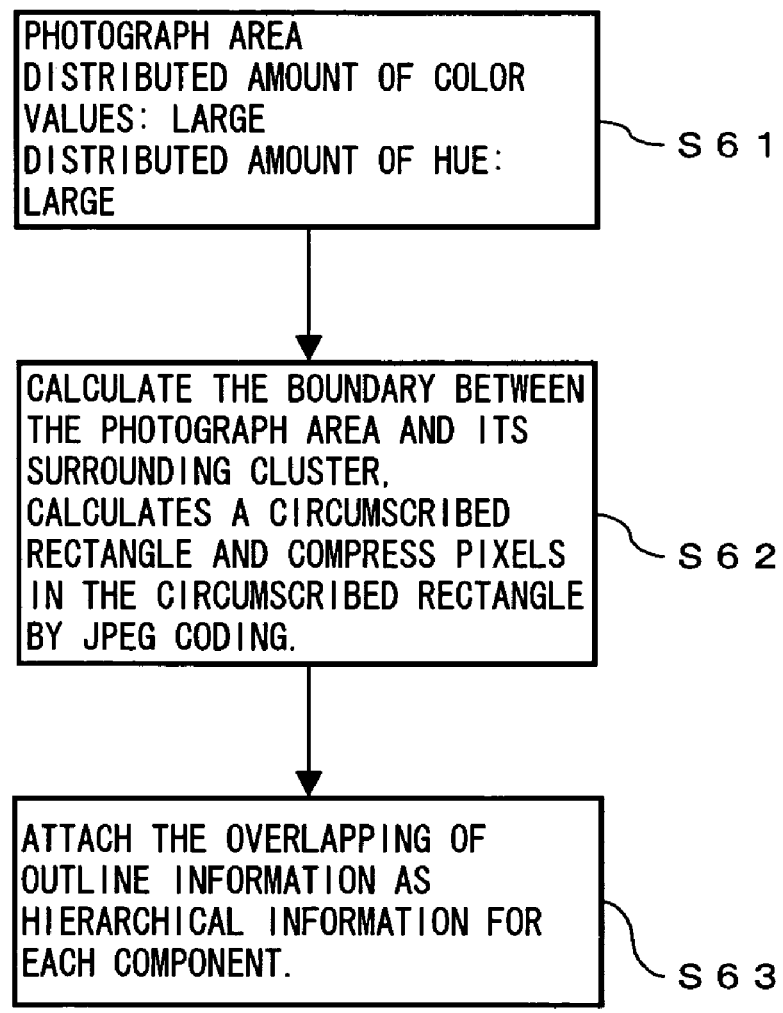
F I G. 1 3

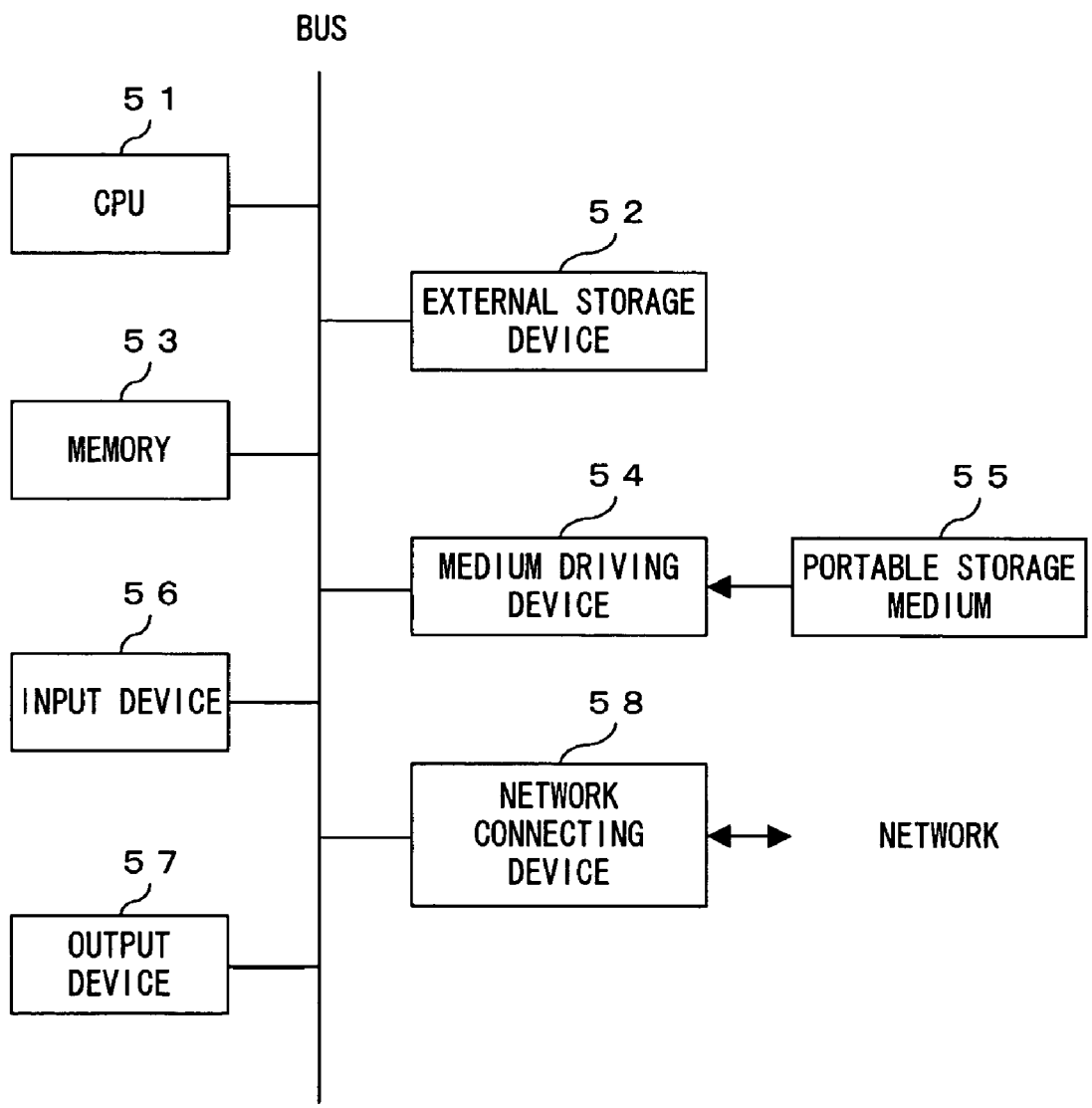
F I G. 1 9

COLOR IMAGE COMPRESSING METHOD AND DEVICE

BACKGROUND OF THE INVENTION

1. Field of the Invention

The present invention relates to a color image compressing method for compressing color images read by a scanner or the like and a device thereof.

2. Description of the Related Art

JPEG (joint photographic coding experts group) coding is conventionally known as an image compressing method. JPEG coding divides an image into a plurality of blocks, performs discrete cosine transform (DCT) and quantizes/encodes the obtained values.

JPEG coding is suitable for compressing images, such as a photograph and the like. However, since image information is compressed by coarsely quantizing its RF element, the edge of a character that has a large change in brightness and color and the like becomes unclear, which is a problem.

In order to solve such a problem, Patent reference 1 discloses a technology for transmitting/receiving images superior in reproducing black edges by extracting the black edge of a color image, encoding the location of the black edge, transmitting it together with a color image encoded by a JPEG method and compensating for the pixel of the black edge, based on the black edge information decoded on the receiving side.

Patent reference 2 discloses an area determining unit dividing an image into character area data and photograph area data, and extracting both data, a photograph image encoding unit encoding photograph area data, and a monochrome image encoding unit encoding digitized character area data.

If a manuscript including characters and the like is read by a scanner, the outline of a character area takes neutral tints and no sharp edges exist. Therefore, no clear area determination can be conducted, which is another problem. In order to solve such a problem, Patent reference 3 discloses an outline correcting unit compensating for a pixel recognized as neutral tints, based on the color difference between its adjacent pixels.

However, since in the method of Patent reference 1, data indicating the location of a black edge must be transmitted separately from color image data, it is difficult to improve a data compression ratio.

In the compression method of Patent reference 2, although a photograph area and a character area are distinguished, this distinction depends on the fact that at the edge of a character area, a pixel with a high density level and a pixel with a low density level adjoin each other.

In the method of Patent reference 3, area determination accuracy is simply improved by replacing the value of a pixel with neutral tints in the outline of an area, with the value of its adjacent pixel whose color difference is a minimum.

All the above-mentioned conventional compression methods realize compression by reducing the redundancy of image data after being read by a scanner and the like, and can not reduce redundancy caused when the scanner and the like reads a manuscript, by extracting the features of the ruled lines, characters or the like of the original manuscript. Therefore, a color image including a ruled line, a character and the like cannot be compressed at a high compression ratio and also the outline of a character and the like cannot be clearly displayed.

Patent Reference 1:
Japanese Patent Application Laid-open No. 8-279913

Patent Reference 2:
Japanese Patent Application Laid-open No. 8-298589

Patent Reference 3:
Japanese Patent Application Laid-open No. 2001-61062

Patent Reference 4:
Japanese Patent Application Laid-open No. 8-16793

SUMMARY OF THE INVENTION

It is an object of the present invention to improve the compression ratio of a color image, to keep the outline of a character and the like clear, to maintain the characteristic of a plane area when displaying it.

The color image compressing method of the present invention compresses a color image read by an optical sensor. The method comprises a step of counting the number of appearances of the hue value of each pixel in a color image, generating a hue histogram and storing the histogram in a storage unit, a step of reducing the number of hue values of the entire color image, based on the hue histogram, allocating the number-reduced hue value to each pixel and classifying the pixels of the entire color image into clusters based on the newly allocated hue value and a step of determining the characteristic of each cluster and encoding pixels in each cluster by a coding method suitable for the character of the cluster.

According to this invention, by allocating fewer number of hue values than that of the read color image, to each pixel and classifying the pixels of the entire color image into clusters, based on the hue value, the number of clusters needed to determine its characteristic can be reduced. By encoding the pixels by a coding method suitable for the characteristic of each character-determined cluster, its compression ratio can be improved and also a compressed image, the outlines of whose characters and ruled lines are clear can be obtained.

Another color image compressing method of the present invention is also used to compress a color image read by an optical sensor. The method comprises a step of dividing a color image into a plurality of areas and determining the characteristic of each area, based on both the distributed amount of a color value and the distributed amount of a hue of pixels in each area, a step of counting the number of appearances of the hue value of each pixel in a color image, generating a hue histogram and storing the histogram in a storage unit, a step of reducing the number of hue values of the entire color image, based on the hue histogram, allocating the number-reduced hue value to each pixel and classifying the pixels of the entire color image into clusters based on the newly allocated hue value, and a step of determining the characteristic of each cluster and encoding pixels in each cluster by a coding method suitable for the character of the cluster.

According to this invention, the characteristic of each area can be determined based on both the distributed amount of a color value and the distributed amount of a hue of pixels in each area. For example, it can be determined which each area is, a photograph area, a ruled line/character area, a background area or the like. Furthermore, by allocating fewer number of hue values than that of the read color image, to each pixel and classifying the pixels of the entire color image into clusters, based on the hue value, the number of clusters needed to determine its characteristic can be reduced. By encoding the pixels by a coding method suitable for the characteristic of each character-determined cluster, its compression ratio can be improved and also a compressed color image, the outlines of whose characters and ruled lines are clear can be obtained.

In the above-mentioned color image compressing method, it is determined whether the relevant cluster belongs to, a ruled area or a character area, based on the features of the outline of the cluster, and a cluster determined to belong to a ruled line area and a cluster determined to belong to a character area are encoded by a coding method suitable for the characteristic of their respective areas.

By such a configuration, it can be determined whether the relevant cluster belongs to, a ruled area or a character area, based on the features of the outline of the cluster, and a color image can be compressed by a coding method suitable for the characteristic of the area. Thus, its compressed color image, the outlines of whose characters and ruled lines are clear, can be obtained.

In the above-mentioned color image compressing method, a color image is divided into a plurality of areas, both the distributed amount of a color value and the distributed amount of a hue of each area are computed, it is determined which each area is, a photograph area, a ruled line/character area or a background area, based on the distributed amount of a color value and the distributed amount of a hue, and whether the cluster belongs to, a character area or a ruled line area is determined by extracting the features of the outline of the cluster.

By such a configuration, which each cluster belongs to, a photograph area, a ruled line/character area or a background area can be accurately determined. Furthermore, whether the cluster belongs to, a character area or a ruled line area can be determined by extracting the features of its outline. The outline can be extracted, for example, by tracing the outline and detecting the number of change points at which the direction of the trace changes. Thus, the compression ratio of data can be improved, and a compressed image, the outlines of whose characters and ruled lines are clear, can be obtained.

In the above-mentioned color image compressing method, it is determined whether each cluster belongs to, a character area or a ruled line area, based on both the area determined based on the distributed amount of a color value and the distributed amount of a hue, and whether the area is a character or ruled area, determined based on the features of the outline of the cluster, and clusters in a character area and clusters in a ruled line area are encoded by a coding method suitable for their respective areas.

By such a configuration, a character/rule line area can be distinguished from other areas, based on the distributed amount of a color value and the distributed amount of a hue, and a character area and a ruled line area can be distinguished based on the features of the outline of a cluster. Thus, since a character area and a ruled line area can be encoded by a coding method suitable for their respective areas, the compression ratio of data can be improved, a compressed color image, the outlines of whose characters and ruled lines are clear, can be obtained.

The color image compressing device of the present invention compresses a color image read by an optical sensor. The device comprises a hue histogram generating unit counting the number of appearances of the hue value of each pixel in a color image and generating a hue histogram, a cluster classifying unit reducing the number of hue values of the entire color image, based on the hue histogram, allocating the number-reduced hue value to each pixel and classifying the pixels of the entire color image into clusters based on the newly allocated hue value and an encoding unit determining the characteristic of each cluster and encoding pixels in each cluster by a coding method suitable for the character of the cluster.

According to this invention, by allocating fewer number of hue values than that of a color image read from a manuscript or the like, to each pixel and classifying the pixels of the entire color image into clusters, based on the hue value, the number of clusters needed to determine their respective characteristics can be reduced. By determining the characteristic of each cluster and encoding each cluster by a coding method suitable for the characteristic of each cluster, its compression ratio can be improved and also a compressed color image, the outlines of whose character and ruled line are clear, can be obtained.

BRIEF DESCRIPTION OF THE DRAWINGS

FIG. 4 shows an area determination table;
FIGS. 7A and 7B show a colored determination table and a monochrome determination table, respectively;
FIG. 13 is a flowchart showing a photograph area encoding process;
FIG. 19 shows the configuration of a data processing device.

DESCRIPTION OF THE PREFERRED EMBODIMENTS

Figure 1:
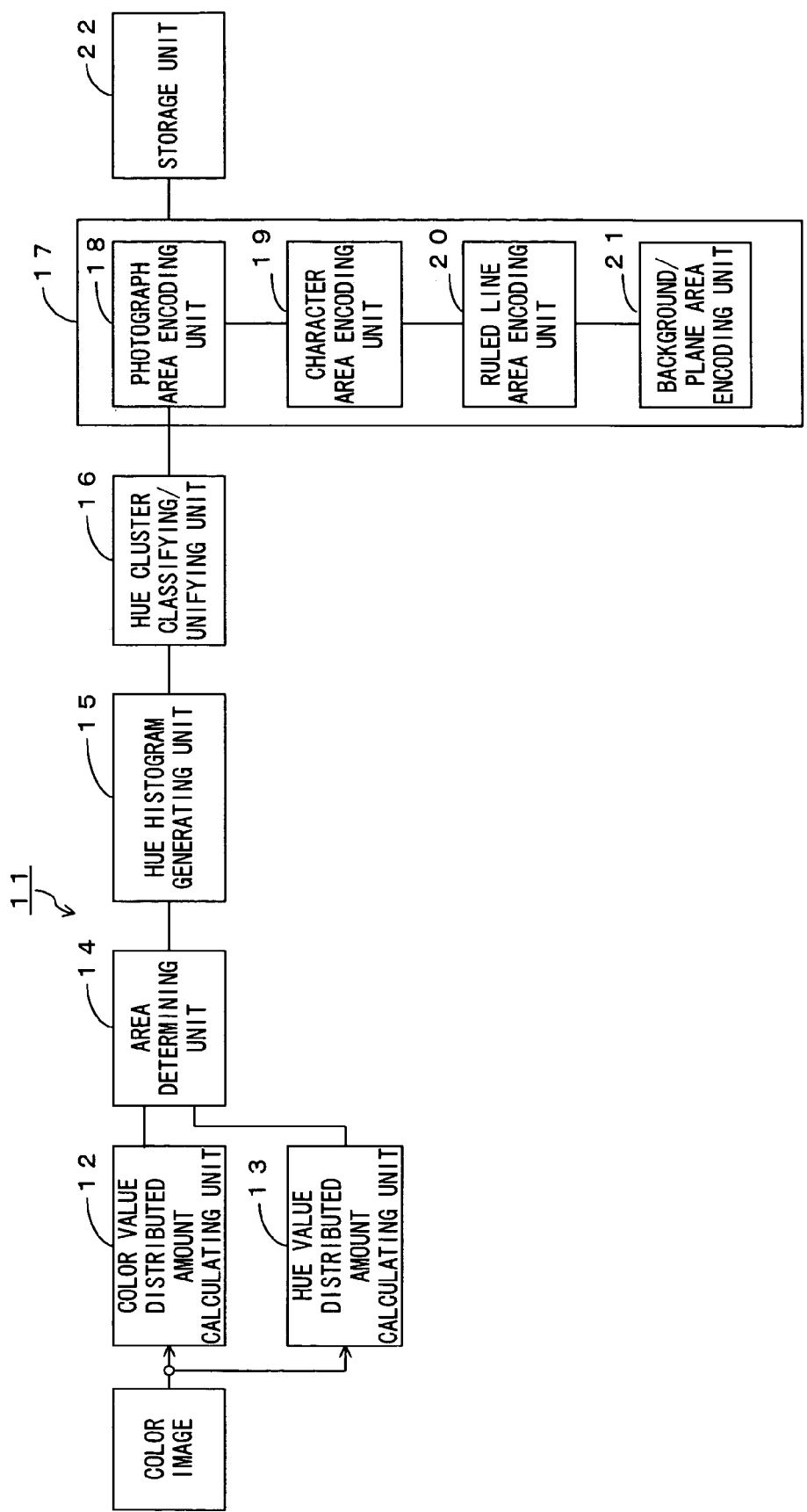
FIG. 1 shows the configuration of a color image compressing device.

The preferred embodiments of the present invention are described below with reference to the drawings. FIG. 1 shows the configuration of a color image compressing device according to the present invention.

In the following description, it is assumed that a four-to-six color printed manuscript is read by an optical sensor, such as a scanner or the like, and the read color image is compressed. It can also be a color image photographed or read by a camera or the like.

If a scanner reads a four-to-six color printed image, a far greater number of R, G and B color data than that of an original manuscript is generated from a read color image since the shade of ink and the respective positions of R, G and B optical sensors are not uniform. Usually several tens of thousands of color images are outputted from a scanner.

In FIG. 1, a hue value distributed amount calculating unit 12 divides an inputted color image into a predetermined number of areas, and calculates the respective distributed amount of R, G and B colors of pixels in each area. A hue value distributed amount calculating unit 13 converts the R, G and B data of each area into HSL data composed of hue value H, saturation S and luminance L, and calculates the distributed amount of a hue of each area.

An area determining unit 14 determines which each area is, a photograph area, a ruled line/character area or a background/plane area, based on both the distributed amount of a color value and the distributed amount of a hue.

A hue histogram generating unit 15 counts the times of appearance of each hue of the pixels of each area and the entire area, and generates colored and monochrome hue histograms. The generation of a hue histogram is applied to pixels other than those in a photograph area.

A hue value cluster classifying/unifying unit 15 reduces the number of hue values of each pixel in a color image, based on the generated hue histograms, allocates the number-reduced hue value to each pixel and classifies pixels with the same hue value into one cluster. Furthermore, the unit 15 unifies adjacent clusters whose hue value is below a predetermined value. The unit 15 determines whether the size of the relevant cluster exceeds the reference value and determines an area to which the cluster whose size exceeds the reference value belongs, to be a ruled area. The unit 15 traces the outline of a cluster whose size is below the reference value, extracts change points and determines a cluster with a lot of change points to belong to a character area.

An encoding unit 17 comprises a photograph area encoding unit 18, a character area encoding unit 19, a ruled line area encoding unit 20 and a background/plane area encoding unit 21. The encoding unit 17 determines the characteristic of the relevant cluster, based on both the area determined by the area determining unit 14 and whether the cluster belongs to a ruled line area or a character area, and encodes pixels in the relevant area by a coding method suitable for the characteristic of the cluster.

The photograph area encoding unit 18 encodes pixels of clusters in a photograph area into JPEG codes. The character area encoding unit 19 encodes the pixels of clusters in a character area into Huffman codes. The ruled line area encoding unit 20 encodes the pixels of clusters in a ruled line into chain codes. The background/plane area encoding unit 21 encodes the pixels of clusters in a background/plane area into chain and JPEG codes. The image data encoded by the encoding unit 17 is stored in a storage unit 22.

Next, the image data compressing processes of the color image compressing device 11 are described with reference to the following flowcharts. These processes are executed by the CPU of the color image compressing device 11 or the like.

Figure 2:
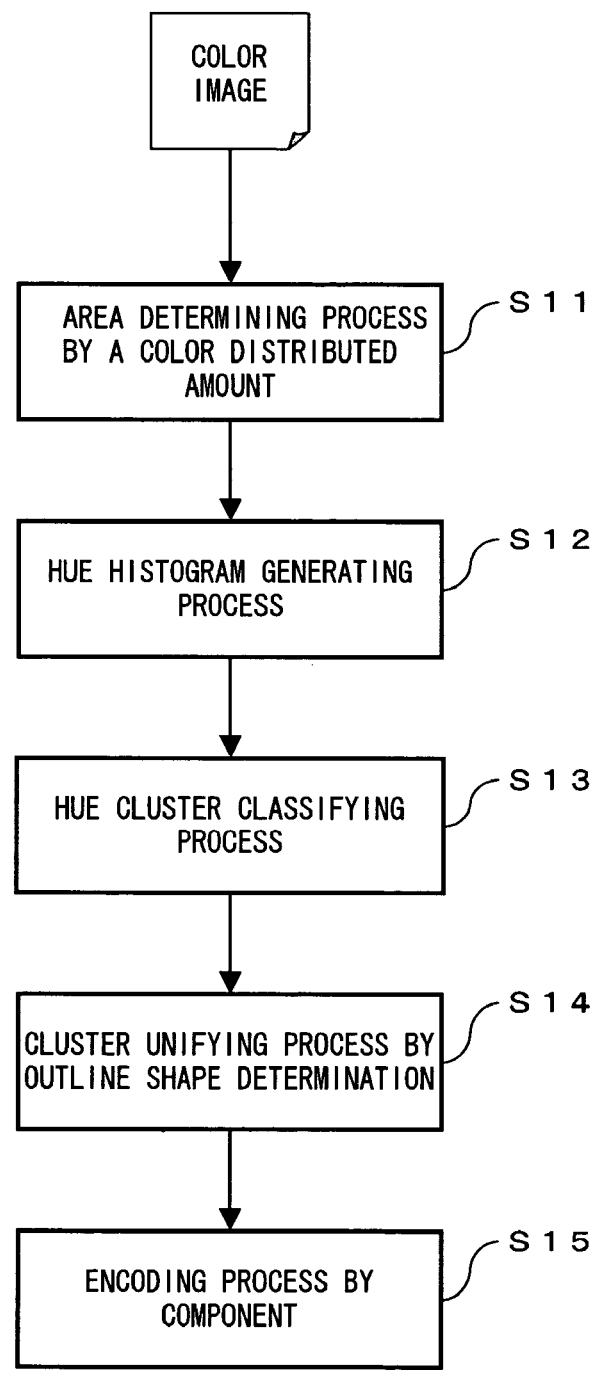
FIG. 2 is a basic flowchart showing the color image compressing process.

FIG. 2 is a basic flowchart showing the color image compressing process.

Firstly, in the area determining process of step S11 shown in FIG. 2, an inputted color image is divided into a predetermined number of areas, for example, 64×64 pixel areas, both the distributed amount of a color value and the distributed amount of a hue value are calculated for each area, and it is determined which each area is, a photograph area, a ruled line/character area or a background/plane area based on the distributed amount of the color value and the distributed amount of the hue value.

Then, in the hue histogram generating process of step s12 shown in FIG. 2, the colored hue histogram and monochrome hue histogram are generated for each 256×256 pixel area other than the photograph area.

Then, in the hue cluster classifying process of step S13 shown in FIG. 2, a hue value limited to a specific number (for example, 56 colored and 8 monochrome colors) is allocated to each pixel of the entire color image, and pixels with the same hue value are classified into one cluster for each hue value.

Then, in the cluster unifying process of step S14 shown in FIG. 2, it is determined whether each cluster belongs to, a character area or a ruled line area, based on its outline shape, and clusters whose ruled line area adjoin and whose hue difference between adjacent clusters is small are unified.

Then, in the encoding process of step S15 shown in FIG. 2, each cluster is encoded for each component (a photograph area, a ruled line/character area and a background/plane area).

Figure 3:
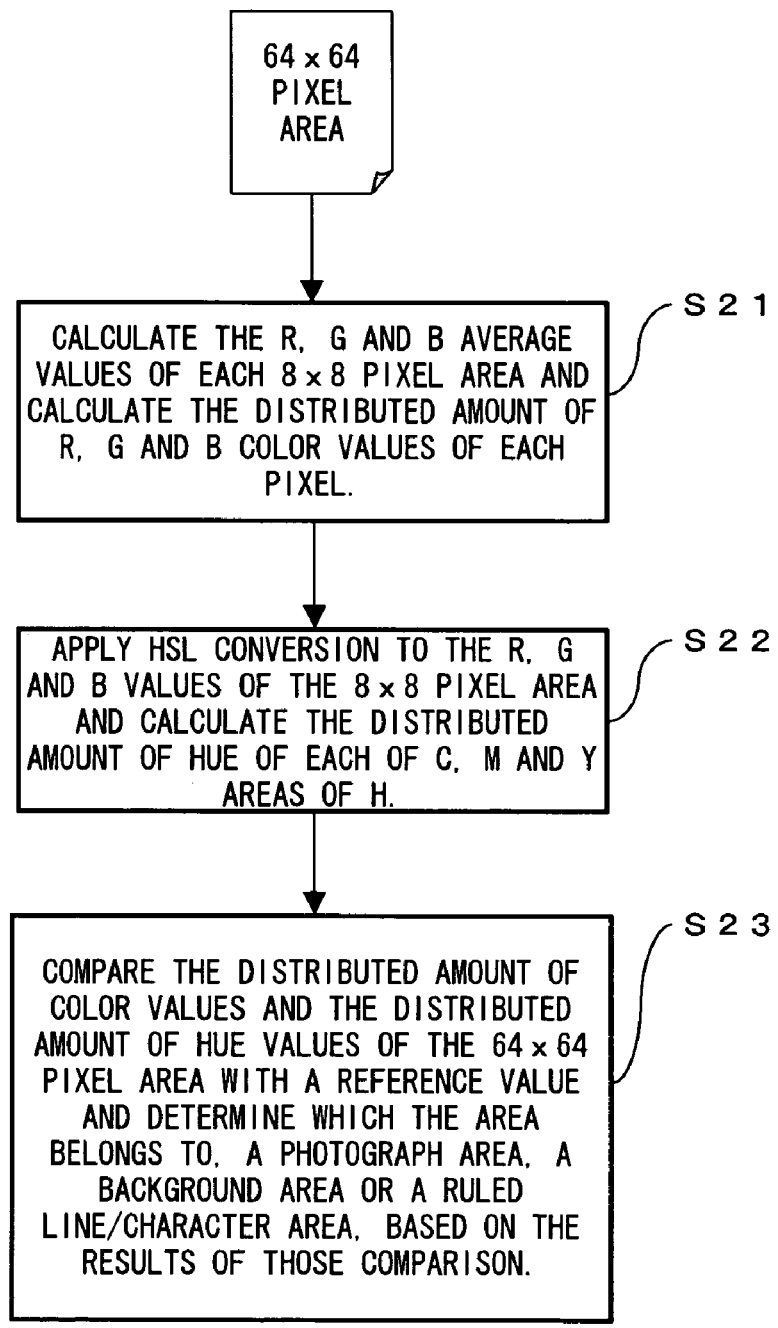
FIG. 3 is a flowchart showing an area determining process.

FIG. 3 is the flowchart showing the area determining process in step S11 shown in FIG. 2.

Firstly, the respective average values of a plurality of segments of the R, G and B data of each pixel in the 8×8 pixel block of the 64×64 pixel area are calculated, and the distributed amount of a color value of the 8×8 pixel area is calculated based on the difference between the R, G and B data of each pixel and the respective average values of a plurality of segments of the R, G and B data of the 8×8 pixel area (S21 in FIG. 3).

The distributed amount of a color value of the entire 8×8 pixel area is calculated according to the following equation (1).

$$D_{rgb} = \sum_{n=1}^{64} ((R_n - R_a)^2, (G_n - G_a)^2, (B_n - B_a)^2) \tag{1}$$

In the above-mentioned equation (1), Ra, Gb and Bc are the average values of a plurality of segments of the respective R, G and B gradation data, respectively, of pixels in the 8×8 pixel area, and Rn, Gn and Bn are the R, G and B gradation data of an arbitrary pixel in an area, respectively. Drgb is the distributed amount of the R, G and B gradation data of the entire 8×8 pixel area.

By calculating the respective sum of the squared difference between the R, G and B gradation data Rn, Gn and Bn of each pixel and the average values Ra, Gb and Bc of each segment of gradation data, the distributed amount of the R, G and B gradation data of the entire 8×8 pixel area can be calculated.

Then, the R, G and B data of each pixel in the 8×8 area is converted into HSL data, and the distributed amount of a hue of each of cyan (C), magenta (M) and yellow (Y) of hue H is calculated (S22 in FIG. 3). HSL conversion means to convert color data into data indicating hue H, saturation S and luminance L. The distributed amount of a hue of the entire 8×8 pixel area is calculated according to the following equation (2).

$$D_c = \sum_{n=1}^{64} (H_n - H_c)^2 \tag{2}$$

$$D_m = \sum_{n=1}^{64} (H_n - H_m)^2$$

$$D_y = \sum_{n=1}^{64} (H_n - H_y)^2$$

$$D_h = D_c + D_m + D_y$$

In the above-mentioned equation (2), Hc, Hm and Hy represent the average hue value of each of cyan (C), magenta (M) and yellow (Y), respectively, in the 8×8 pixel area, and Hn represents the hue value of an arbitrary pixel in an area. Dc, Dm and Dy represent the distributed amount of a hue in each of cyan (C), magenta (M) and yellow (Y) areas, respectively, and Dh represents their total value, that is, the distributed amount of a hue H in the 8×8 pixel area.

By calculating the sum of the squared differences between the value of a hue H of each pixel in the 8×8 pixel area and the average hue values Hc, Hm and Hy of each of cyan, magenta and yellow areas, the distributed amounts of a hue, Dc, Dm and Dy in each of C, M and Y color spaces can be calculated according to the above-mentioned equation. Furthermore, by summing these distributed amounts of a hue, Dc, Dm and Dy, the distributed amount Dn of a hue of the entire 8×8 pixel area can be calculated.

Then, by summing the distributed amount of a color value and distributed amount of a hue value of each 8×8 pixel area in the 64×64 pixel area calculated in the above-mentioned process, the distributed amount of a color value and distributed amount of a hue of the 64×64 pixel area are calculated. Then, by comparing the distributed amount of a color value and the distributed amount of a hue with a first reference value A (for example, 4,096) and a second reference value B (for example, 153,600), respectively, it is determined which is the relevant area, a photograph area, a ruled line/character area or a background/plane area (S23 in FIG. 3).

FIG. 4 shows an area determining table 31 used for the above-mentioned area determining process in step S23.

Based on the area determining table 31, if the distributed amount Drgb of a color value of an area is larger than the first reference value A and the distributed amount Dh of a hue is larger than the second reference value B, it is determined that the area is a photograph area.

If the distributed amount Drgb of a color value is larger than the first reference value A and the distributed amount Dh of a hue is smaller than the second reference value B, it is determined that the area is a ruled line/character area.

If the distributed amount Drgb of a color value is smaller than the first reference value A and the distributed amount Dh of a hue is smaller than the second reference value B, it is determined that the area is a background/plane area.

Figure 5:
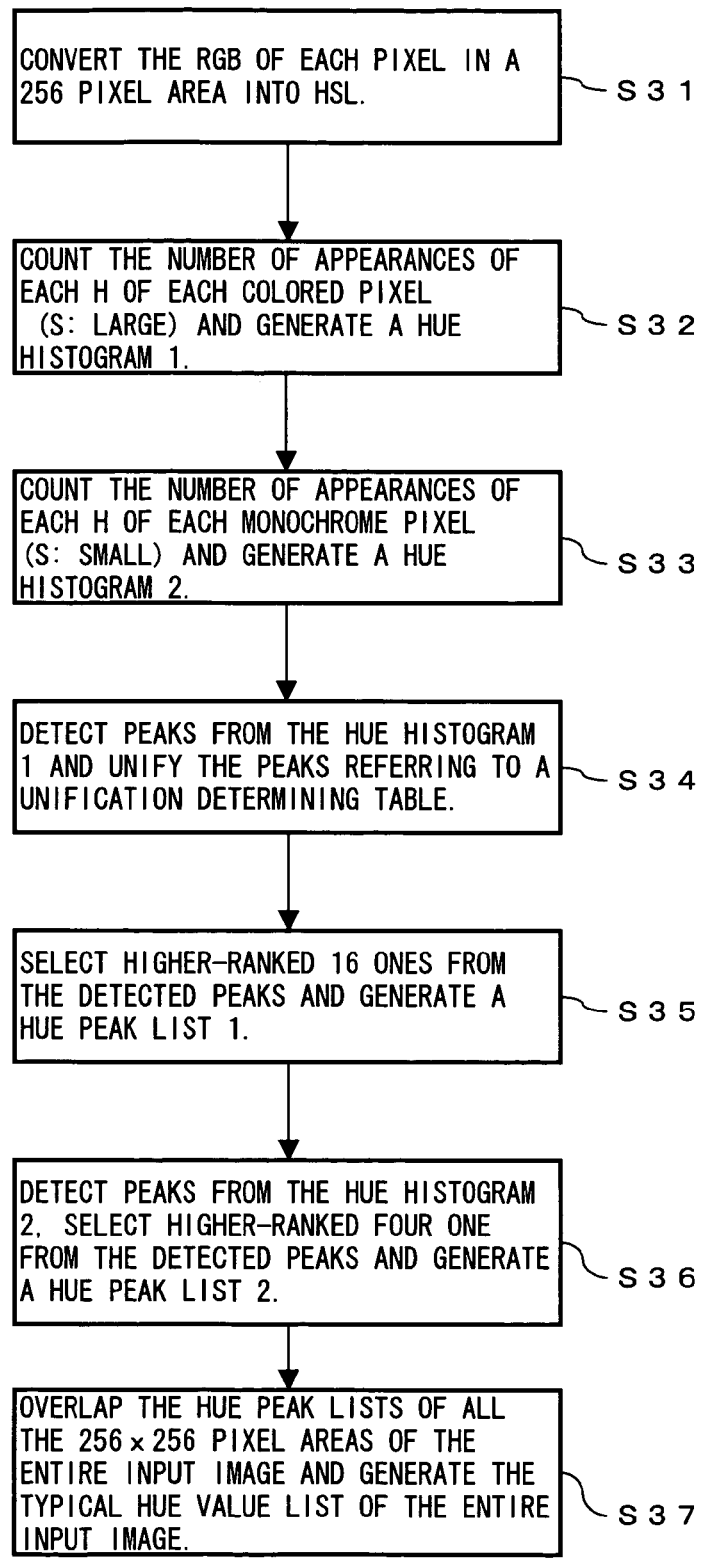
FIG. 5 is a flowchart showing a hue histogram generating process.

FIG. 5 is a flowchart showing the hue histogram generating process in step S12 shown in FIG. 2. A hue histogram generating process is applied to pixels in areas other than a photograph area. A hue histogram, a peak list and the like, which are generated in the following process are stored in the memory of the storage unit 22.

The R, G and B data of each pixel in a 256×256 pixel area is converted into HSL data (S31 in FIG. 5). HSL conversion means to convert color data into data indicating hue H, saturation S and luminance L.

Then, it is determined whether the relevant pixel is colored, the number of appearances of each colored hue H is counted and a hue histogram 1 (colored hue histogram) is generated (S32 in FIG. 5).

Figure 6:
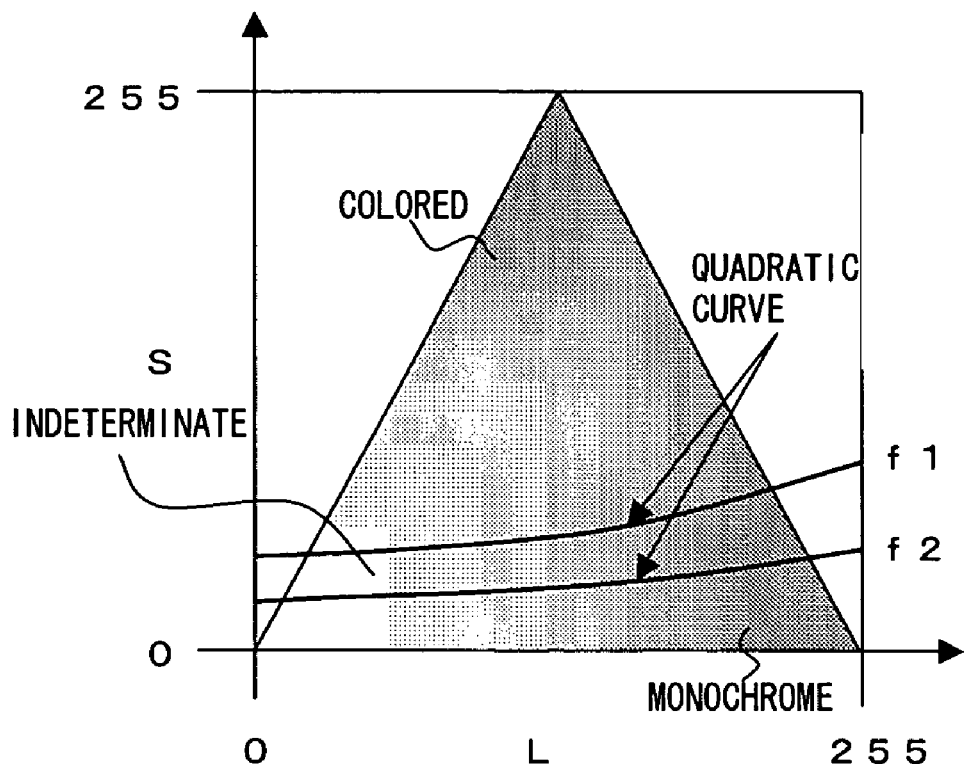
FIG. 6 shows the boundary between colored and monochrome colors.

Here, the method for determining whether the relevant pixel is colored is described. FIG. 6 shows the relationship between the saturation S and luminance L of a red color taking saturation S and luminance L for vertical and horizontal axes, respectively.

In FIG. 6, the larger saturation S in the vertical axis is, the brighter the color becomes. The larger luminance L in the horizontal axis is, the darker the color becomes. Quadratic curves f1 and f2 show a visual colored boundary and a visual monochrome boundary, respectively, and a pixel located between the quadratic curves f1 and f2 takes an indeterminate color, which cannot be determined to be colored, or monochrome alone.

The quadratic curves f1 and f2 can be expressed as follows.

$$f1=(1/400)(255-LUM)2+10$$

$$f2=(1/2)(1/4,000)(255-LUM)2+10$$

If the saturation S and luminance L (LUM) of a pixel are determined, the lower limit of saturation S above which the relevant pixel becomes colored in each luminance can be calculated according to the above-mentioned equation "f1=(1/400)(255-LUM)2+10". Therefore, it can be determined whether the pixel is colored, based on whether saturation S exceeds the lower limit. The upper limit of saturation S below which the relevant pixel becomes monochrome in each luminance can be calculated according to the above-mentioned equation "f2=(1/2)(1/4,000)(255-LUM)2+10". Therefore, it can be determined whether the pixel is monochrome, based on whether saturation S is below the upper limit.

In this preferred embodiment, both a value indicating the lower limit of a colored color on quadratic curve f1 and a value indicating the upper limit of a monochrome color on quadratic curve f2, of each luminance LUM are calculated in advance, and the colored determination table 32 and the monochrome determination table 33 shown in FIGS. 7A and 7B, respectively, are generated.

The colored determination table 32 and the monochrome determination table 33 shown in FIGS. 7A and 7B, respectively, are generated using saturation S obtained by assigning luminance LUM to the above-mentioned equations f1 and f2.

The numeric values on the leftmost vertical axis side of each of the determination tables 32 and 33 indicate luminance of 0 up to 15, and the numeric values on the top horizontal axis "+0", "+16", "+32" and so on indicate luminance "0", "16", "32" and so on to be added to the luminance on the vertical axis 0 through 15. Each point of the determination tables 32 and 33 in which the vertical and horizontal axes intersect indicates the lower limit of f1 of colored saturation S and the upper limit of f2 of monochrome saturation S, respectively, corresponding to the relevant luminance.

For example, if the luminance of the relevant pixel is "0", it is known from the colored determination table 32 that the value of the point in the quadratic curve f1 is "26". Therefore, if the saturation S of the pixel is "26" or more, it can be determined that the pixel is colored. It is also known from the monochrome determination table 33 that the value of the point in the quadratic curve f2 is "13". Therefore, if the saturation S of the pixel is "13" or less, it can be determined that the pixel is monochrome.

By using above mentioned colored determination table 32 and monochrome determination table 33, it is determined which is the relevant pixel, colored, monochrome or indeterminate. The determination tables 32 and 33 are stored in the storage unit 22 in advance. As requested, the CPU reads them and stores them in memory.

Back to FIG. 5, it is determined whether the relevant pixel is monochrome, based on both the luminance L and saturation S of the pixel. If the saturation S of the pixel is equal to or less than the value of f2 and it is determined that the pixel is monochrome, the number of appearances of luminance L of each pixel is counted and the hue histogram 2 (monochrome hue histogram) of 256×256 pixels area other than the photograph area is generated (S33 in FIG. 5).

Then, the peak value of the colored hue histogram 1 of the 256×256 pixels is detected, and the respective peaks of all the hues H are unified with reference to a unification determining table (S34 in FIG. 5).

Figure 8:
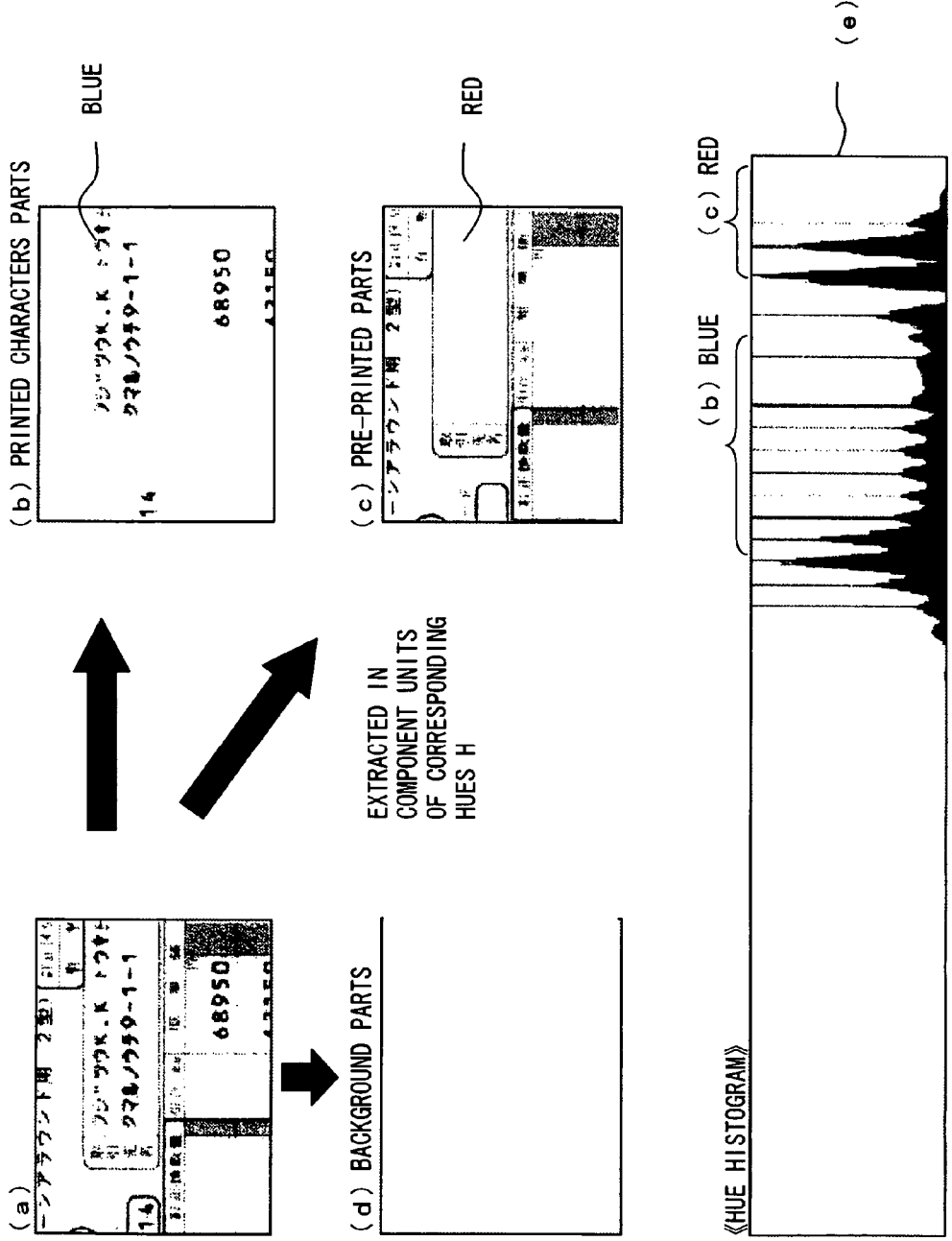
FIG. 8 shows how to generate a hue histogram.

Here, a hue histogram is described with reference to FIG. 8. FIG. 8(a) shows a part of an image obtained by a scanner reading a printed manuscript in which an individual trader name is inputted in a slip with input fields preprinted in a specific format.

In FIG. 8(a), the characters and ruled lines printed on the slip and the trader name and the like inputted to the slip later are printed in red and blue, respectively. FIG. 8(b) shows the trader name inputted later, which is printed in blue. FIG. 8(c) shows the characters and ruled lines preprinted in the slip, which are printed in red. The remaining part is shown as a background in FIG. 8(d).

If the hue histogram of the same hue element in the image above mentioned is generated, the hue histogram of the blue pixels of the inputted characters shown in FIG. 8(e) and the hue histogram of the red pixels of pre-printed characters and ruled lines shown in FIG. 8(c) can be generated. The horizontal and vertical axes of the histogram shown in FIG. 8(e) indicate the hue value and the number of appearances of a hue value and a color value, respectively.

If a manuscript of a slip and the like printed in several colors is read by a scanner, a plurality of pixel data whose hue values are slightly different from each other due to the unevenness of printed ink density, as shown in FIG. 8(e), is generated, and a plurality of peaks are detected in the vicinity of the peak of the number of appearances. Therefore, in this preferred embodiment, the peaks that exist in a specific width of the same hue are unified into one peak. However, in this case, the hue width (the horizontal axis of the histogram shown in FIG. 8(e)) varies depending on its hue. Therefore, a unification determining table in which a reference width for the combination of peaks is individually determined for each hue, is generated, and the peaks are unified referring to the unification determining table.

Figure 9:
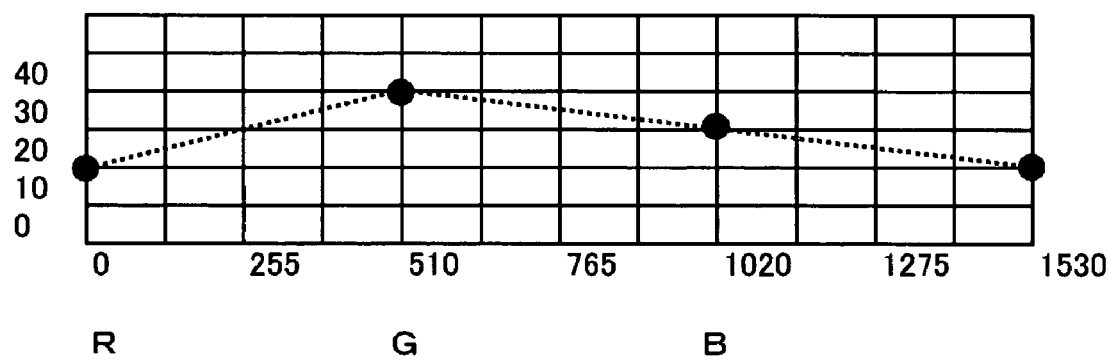
FIG. 9 shows a unification determining table.

FIG. 9 shows the unification determining table. The horizontal and vertical axes indicate a hue value and a hue value width for each hue, which becomes a reference when peaks are unified, respectively. The dotted straight line shown in FIG. 9 indicates the hue value width for each hue, which becomes a reference for such unification for each hue. For example, in the case of red R, peaks whose hue value width is less than 20 are unified into one peak. In the case of green G, peaks whose hue value width is less than 40 are unified into one peak. In the case of blue B, peaks whose hue value width is less than 30 is unified into one peak. Hues between red, green and blue can be obtained by interpolating the hue value widths of those colors.

Back to FIG. 5 again, following step S34, a hue peak list 1 (colored hue peak list) is generated by selecting 16 peaks whose number of appearances rank within 16 from the top, from all the unified peaks. Another peak list is also generated by selecting four peaks whose number of appearances rank within four from the top, from all the peaks of saturation S for each hue H (S35 in FIG. 5). These hue peak lists are collectively called a "hue peak list".

Then, the peaks of the monochrome hue histogram 2 are detected and are similarly unified referring to the unification determining table. After the unification, four peaks whose number of appearances rank within four from the top, are selected from all the detected peaks, and a monochrome hue peak list is generated (S36 in FIG. 5).

Then, the colored peak list and monochrome peak list of each 256×256 pixel area of the entire input image are overlapped (OR operation), and the typical hue value list of the entire input image is generated (S37 in FIG. 5).

By overlapping the hue peak lists of all the 256×256 pixel area of the entire input image, a typical hue value list indicating hue values whose number of appearances is high in all the areas of the input image can be generated.

Figure 10:
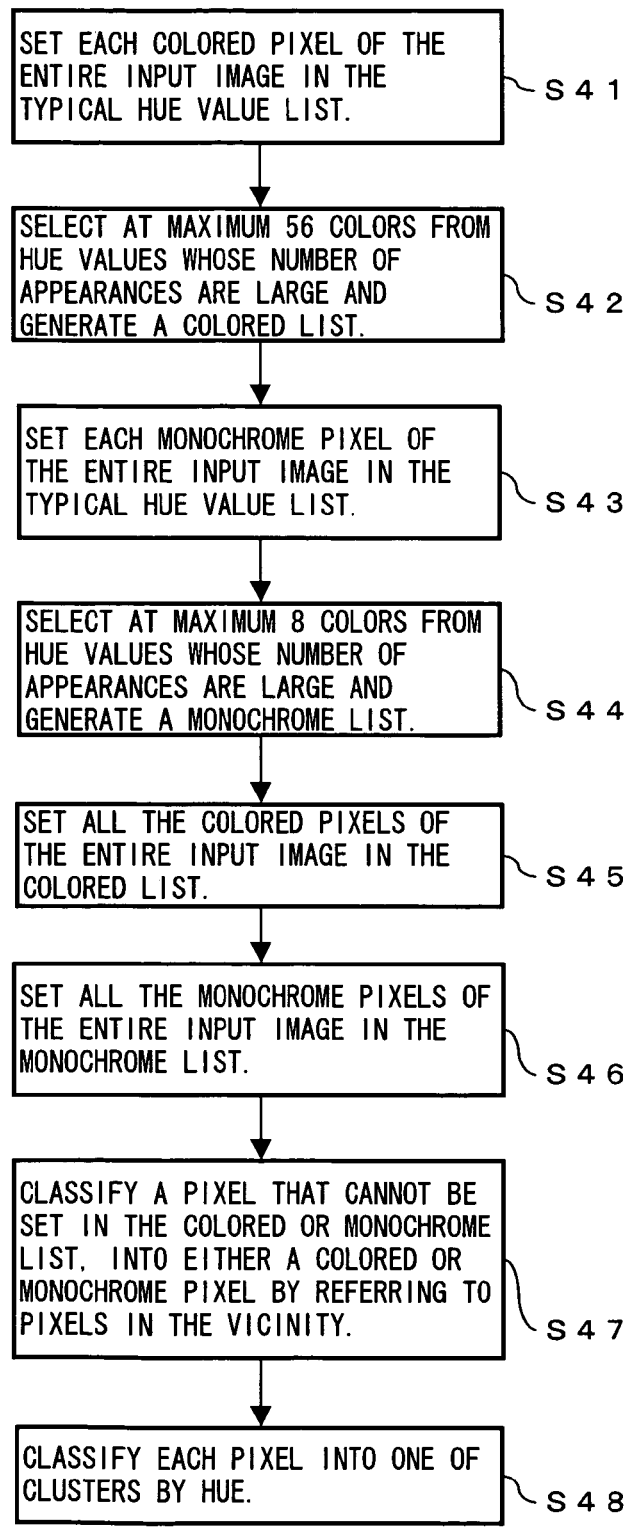
FIG. 10 is a flowchart showing a hue cluster classifying process.

FIG. 10 is a flowchart showing the hue cluster classifying process in step S13 shown in FIG. 2.

The hue value of each colored pixel in the entire input image and the hue value of the typical hue value list are compared, and a hue value whose difference between these hue values is minimum, which is set as the hue value of each pixel (S41 in FIG. 10). Then, at maximum 56 colors, the number of appearances of whose hue value rank within 56 from the top, of all the hue values set for each pixel are selected, and a colored list is generated (S42 in FIG. 10).

The hue value of each monochrome pixel in the entire input image and the hue value of the typical hue value list are compared, and a hue value whose difference between these hue values is minimum, is set as the hue value of each pixel (S43 in FIG. 10). Then, at maximum 8 colors, the number of appearances of whose hue value rank within 8 from the top, of the all hue values set for each pixel are selected, and a monochrome list is generated (S44 in FIG. 10).

The hue value of each colored pixel in the entire input image is set in the colored list (S45 in FIG. 10). Specifically, the hue value of each pixel and the hue value of the colored list are compared, and a hue value whose difference between these hue values is minimum, is set as the hue value of each colored pixel.

Then, the hue value of each monochrome pixel in the entire input image is set in the monochrome list, and a hue value whose difference between these hue values is minimum, is set as the hue value of each monochrome pixel (S46 in FIG. 10).

Then, a pixel that is allocated to be neither a color hue value nor a monochrome hue value is related to either a color or a monochrome hue value (hue information) by checking whether eight pixels in the vicinity are color or monochrome (S47 in FIG. 10).

Thus, each pixel in the entire input image is allocated to either one of at maximum 56 color hue values or one of at maximum eight monochrome hue values, and pixels with the same hue value are classified into one cluster (S48 in FIG. 10).

Figure 11:
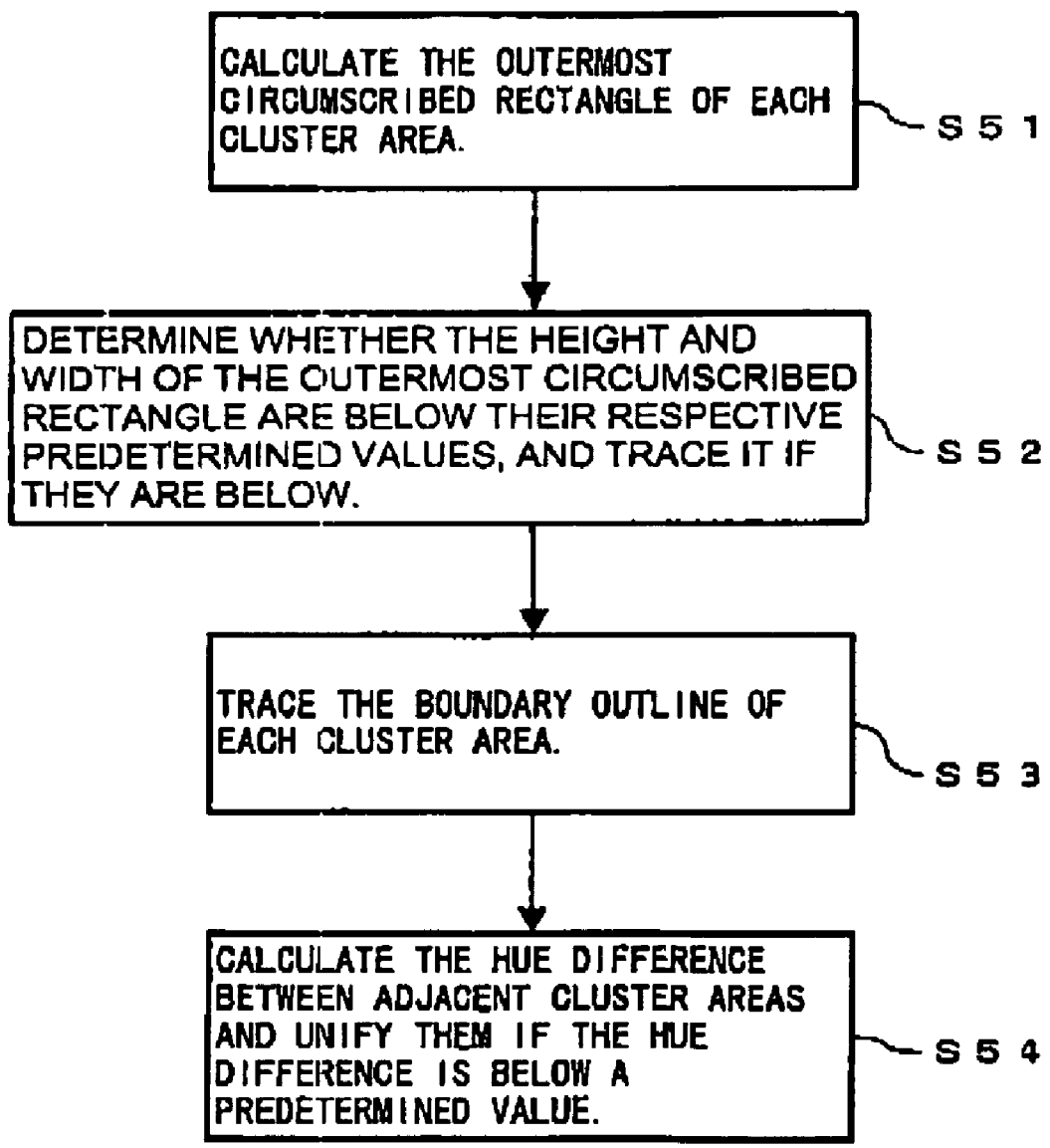
FIG. 11 is a flowchart showing a cluster unifying process.

FIG. 11 is a flowchart showing the cluster unifying process in step S14 shown in FIG. 2.

The outermost circumscribed rectangle of each cluster area is calculated (S51 in FIG. 11). Then, it is determined whether the height and width of the outermost circumscribed rectangle exceed their respective predetermined values. If the height and width are below their respective predetermined values, the outline of the relevant cluster is traced (S52 in FIG. 11). If the height and width exceed their respective predetermined values, it is determined that the area is a ruled line area.

Then, the boundary outline of the selected area is traced, the outline is encoded into chain codes and the encoded data is stored in the storage unit 22 together with the hue information of the cluster (S53 in FIG. 11).

Figure 12A:
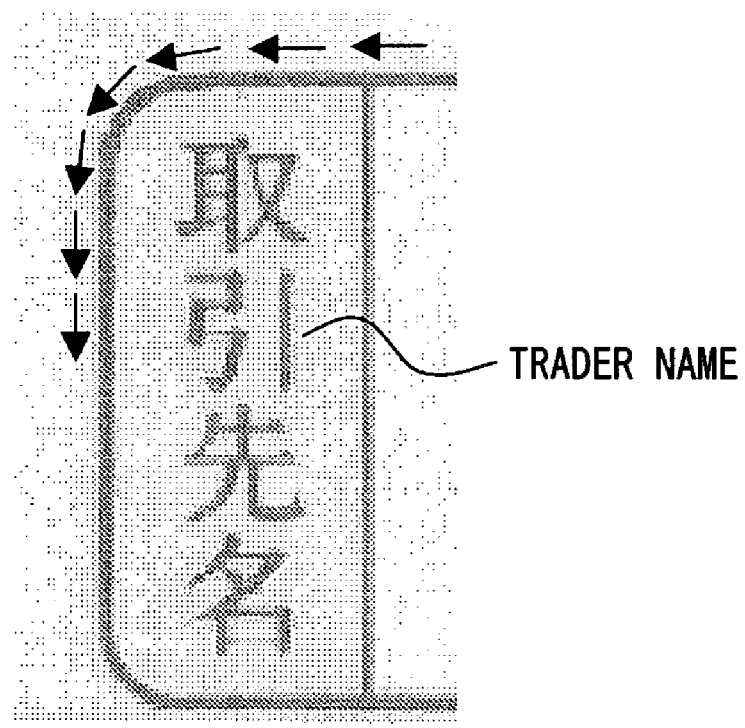
FIGS. 12A and 12B show how to unify clusters.

In FIG. 12A, the ruled line of a slip is traced as an outline. If a scanner reads a color-printed slip, the ruled lines are classified into one cluster with the same hue value or a plurality of clusters with a close hue value by the above-mentioned hue cluster classifying process. If it is determined that the relevant cluster is a ruled line area, as shown in FIG. 12A, the outline of the ruled line is traced.

Figure 12B:
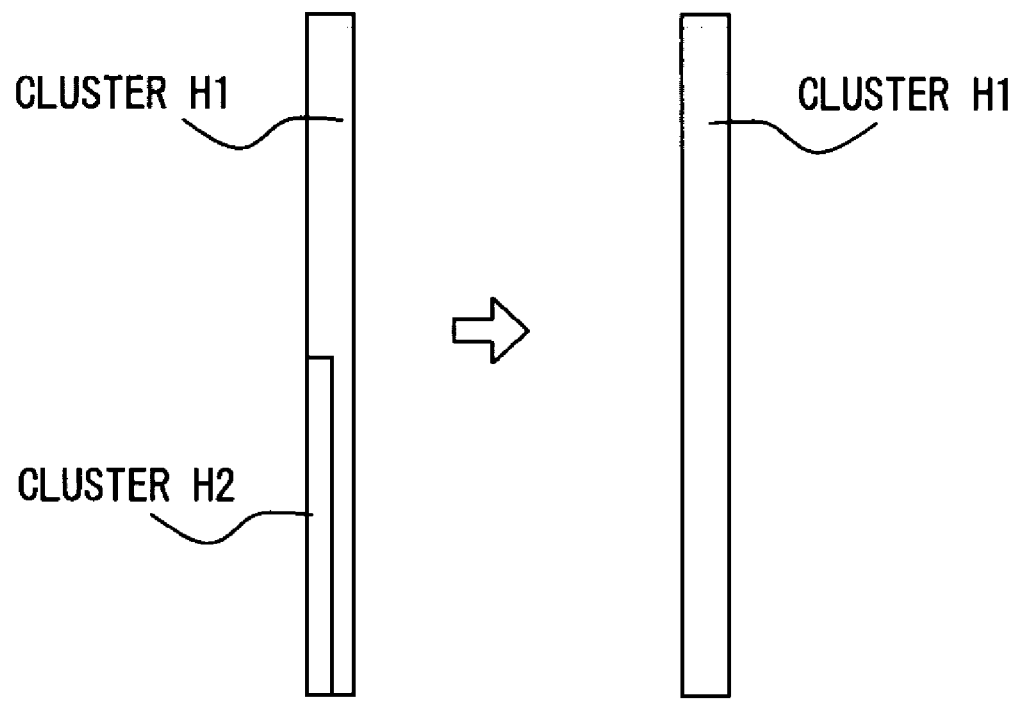

When a cluster is classified by a hue value, as shown in FIG. 12B, sometimes some ruled line area is classified into another cluster for the reason that its hue value is different.

In order to unify the clusters of the same ruled lines into one cluster, in step S54 of FIG. 11, the hue difference between two adjacent clusters, whose outlines have been traced, is calculated. If the hue difference is below a predetermined value, those clusters are unified.

Specifically, the hue difference between two adjacent clusters H1 and H2 shown in FIG. 12B is below a predetermined value, cluster H2 is unified into cluster H1. Thus, even if some ruled line to be classified into the same cluster is classified into another cluster due to the difference in a hue value to be set when being read by a scanner, they can be unified and the total number of clusters can be reduced. After the unification there is no need for outline information about a inside of the cluster, the outline information about the chain-coded ruled line is deleted, and only outline information about an outer boundary is stored.

After the cluster classification/unification by hue has been completed thus, then the encoding process by each component in step S15 shown in FIG. 2 is performed.

FIG. 13 is a flowchart showing the encoding process of a photograph area in the course of the encoding process by each component.

In the area determining process of step S11 shown in FIG. 2, if the distributed amount of a color value of the relevant area and its distributed amount of a hue exceed the first and second reference values, respectively, and it is determined that the area is a photograph area (S61 in FIG. 13), the boundary between the photograph area and its surrounding cluster is calculated, the circumscribed rectangle of the area is calculated and pixels in the circumscribed rectangle are encoded into JPEG codes (S62 in FIG. 13).

Then, the hierarchical information indicating the overlapping state of outline information for each component of a photograph area, a ruled line or character area and the like, is attached (S63 in FIG. 13).

Figure 14:
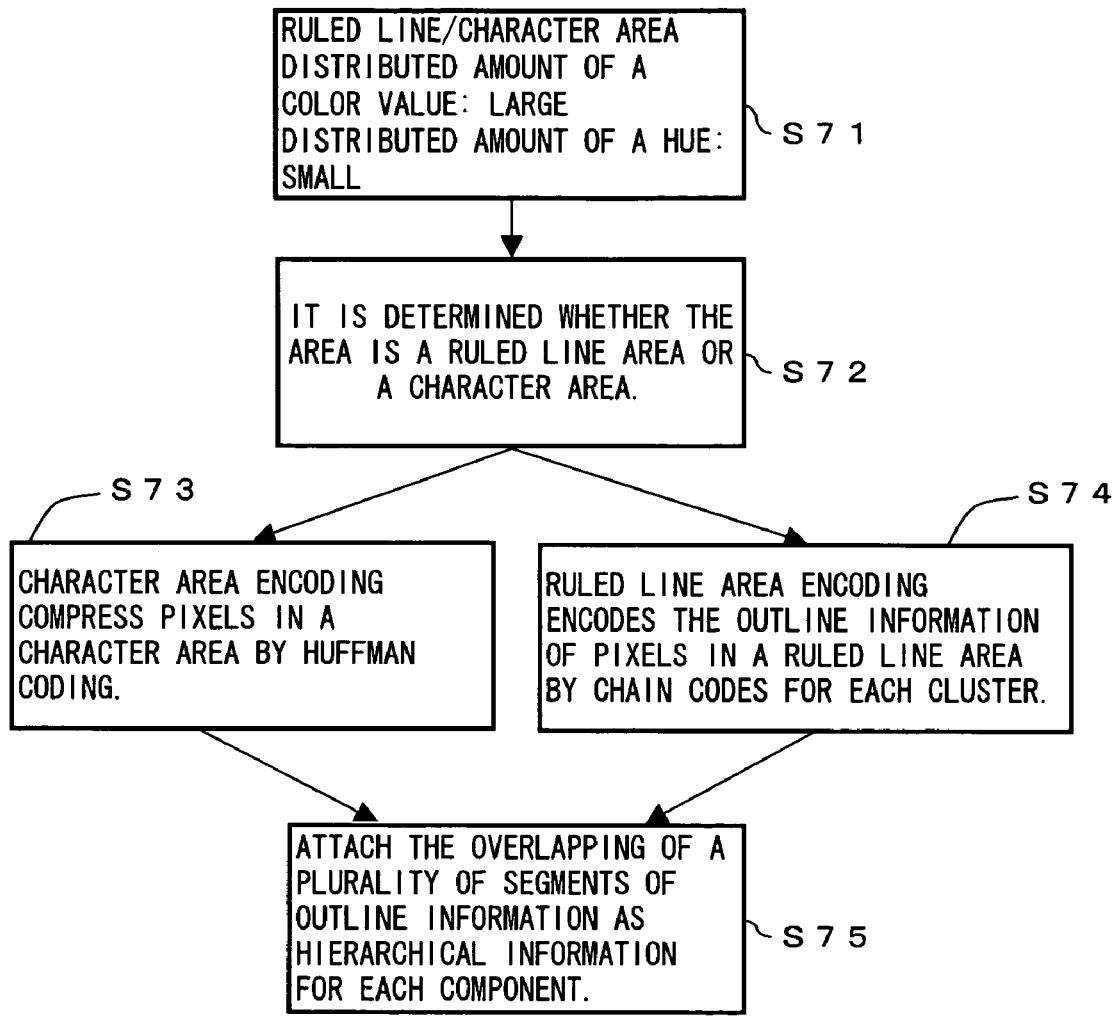
FIG. 14 is a flowchart showing a ruled line/character area encoding process.

FIG. 14 is a flowchart showing the encoding process of a ruled line/character area.

In the area determining process of step S11 shown in FIG. 2, if the distributed amount of a color value of a 64×64 pixel area belonging to the relevant cluster exceeds the first reference value A, its distributed amount of a hue is below the second reference value B and it is determined that the relevant area is a ruled line/character area (S71 in FIG. 14), it is determined whether the cluster belongs to, a character area or a ruled line area (S72 in FIG. 14).

Whether the cluster belongs to, a character area or a ruled line area is determined by whether the height and width of the outermost circumscribed rectangle of the cluster exceed their respective predetermined values. If the height and width of the outermost circumscribed rectangle exceed their respective predetermined values, it is determined that the area is a ruled line area. If the height and width of the outermost circumscribed rectangle are below their respective predetermined values, the outline of its boundary with another cluster is traced, the features of the outline shape are extracted and it is determined whether the area is a character area, based on whether its outline pattern is complex.

Whether the outline pattern is complex is determined based on whether the number of change points, in which the direction of the traced outlines changes, exceeds a specific value. If the height and width of the outermost circumscribed rectangle are below their respective predetermined values and the number of change points in tracing when tracing the outline exceeds a specific value, it is determined that the cluster belongs to a character area. If the number of change points is below the specific value, it is determined that the cluster belongs to a ruled line area.

If it is determined that the characteristic of the relevant cluster is that of a character area, the process proceeds to step S73, and pixels in the cluster are compressed, for example, by Huffman coding.

If it is determined that the characteristic of the relevant cluster is that of a ruled line area, the process proceeds to step S74 shown in FIG. 14, and the outline information of the ruled line area is encoded into chain codes for each cluster.

Following step S73 or S74, it is checked for each component of a character area and a rule line area whether a plurality of segments of outline information overlaps. If outline information overlaps, information indicating the overlapping state is attached as hierarchical information (S75 in FIG. 14).

Here, a process for attaching the hierarchical information indicating the overlapping of outline information for each component when applied to the image shown in FIG. 16(1) is described with reference to the flowchart shown in FIG. 15.

Figure 15:
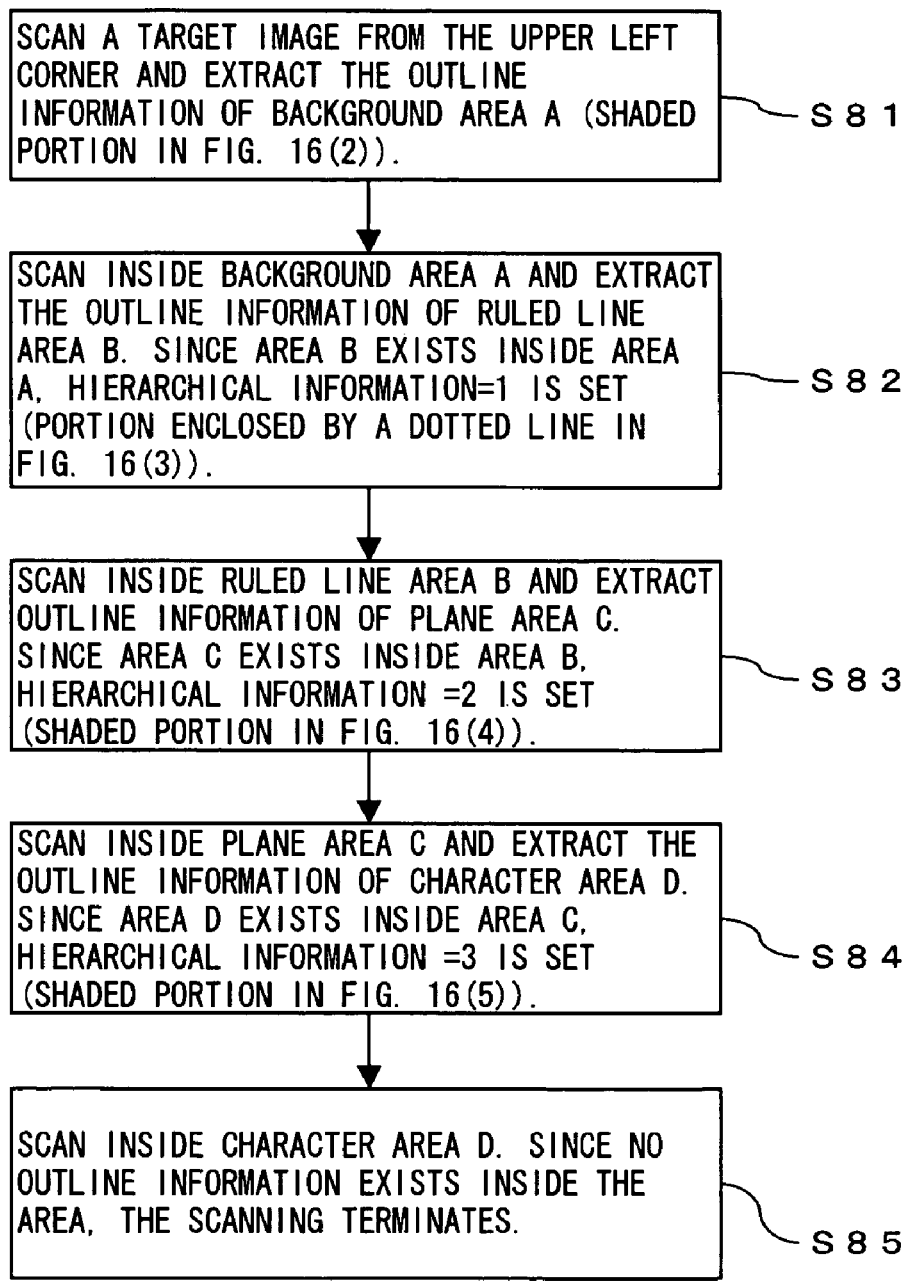
FIG. 15 is a flowchart showing a hierarchy information attaching process.
Figure 16:
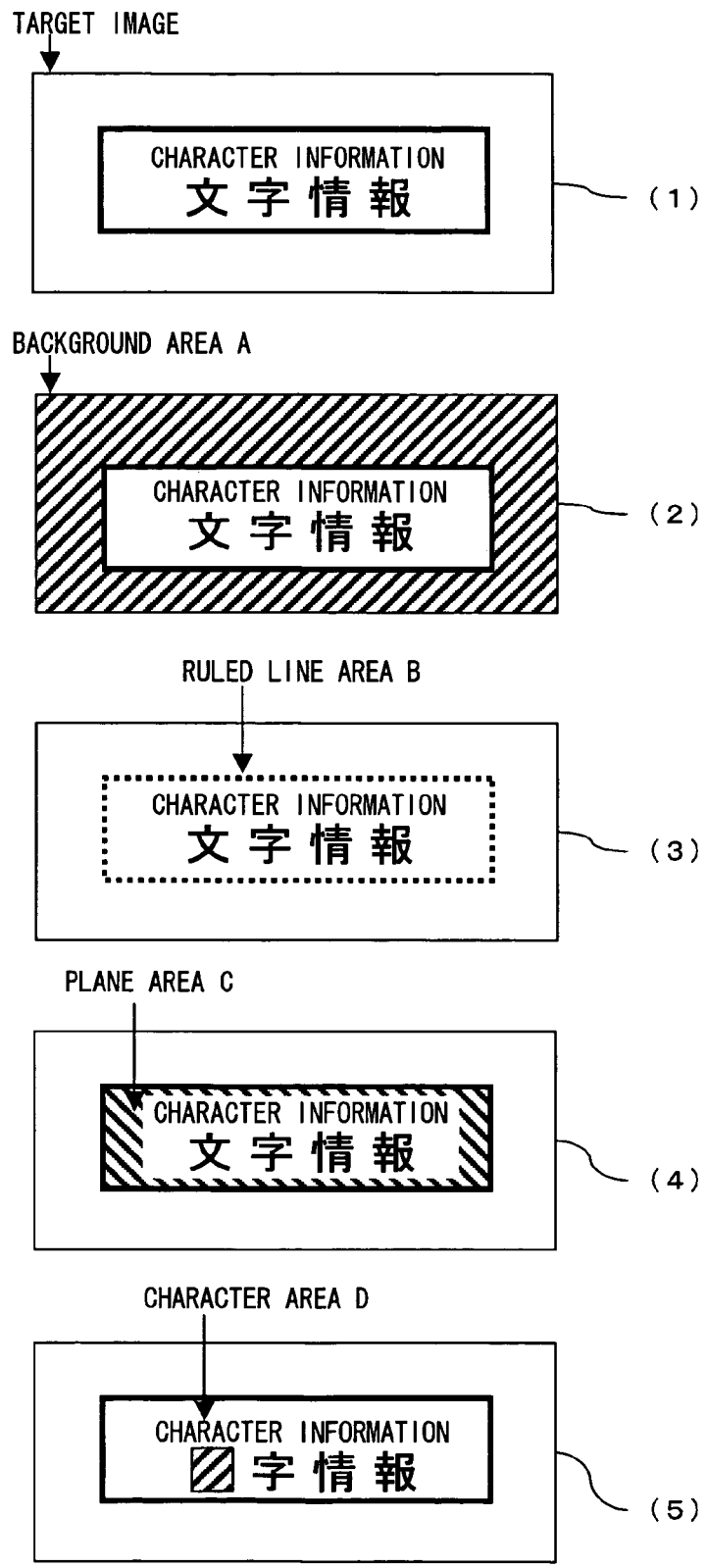
FIG. 16 shows how to generate hierarchy information.

Firstly, a target image is scanned from the upper left corner, and the outline information of a background area a is extracted (S81 in FIG. 15). By this process, the outline information of background area a indicated by a slash mark in FIG. 16(2) is extracted.

Then, the inside of background area a is scanned, and the outline information of a ruled line area b is extracted. Since ruled line area b exists inside background area a, "1" is set as hierarchical information (S82 in FIG. 15). By this process, the outline information of ruled line area b indicated by a dotted line in FIG. 16(3) is extracted.

Then, the inside of ruled line area b is scanned, and the outline information of a plane area c is extracted. Since plane area c exists inside ruled line area b, "2" is set as hierarchical information (S83 in FIG. 15). By this process, the outline information of plane area c indicated by a slash mark around characters "character information (原価金額)" in FIG. 16(4) is extracted.

Then, the inside of plane area c is scanned, and the outline information of a character area d is extracted. Furthermore, character area d exists inside plane area c, "3" is set as hierarchical information (S84 in FIG. 15). By this process, the outline information of character area d indicated by a slash mark in FIG. 16(5) is extracted.

Then, the inside of character area d is scanned. In this case, no outline information exists in the area, the scanning terminates (S85 in FIG. 15).

By the above-mentioned processes, the hierarchical information of each area can be attached when pixels in each area are encoded. When data is reproduced, the compressed data of each area can be reproduced in an appropriate order by referring to the hierarchical information of each area.

Figure 17:
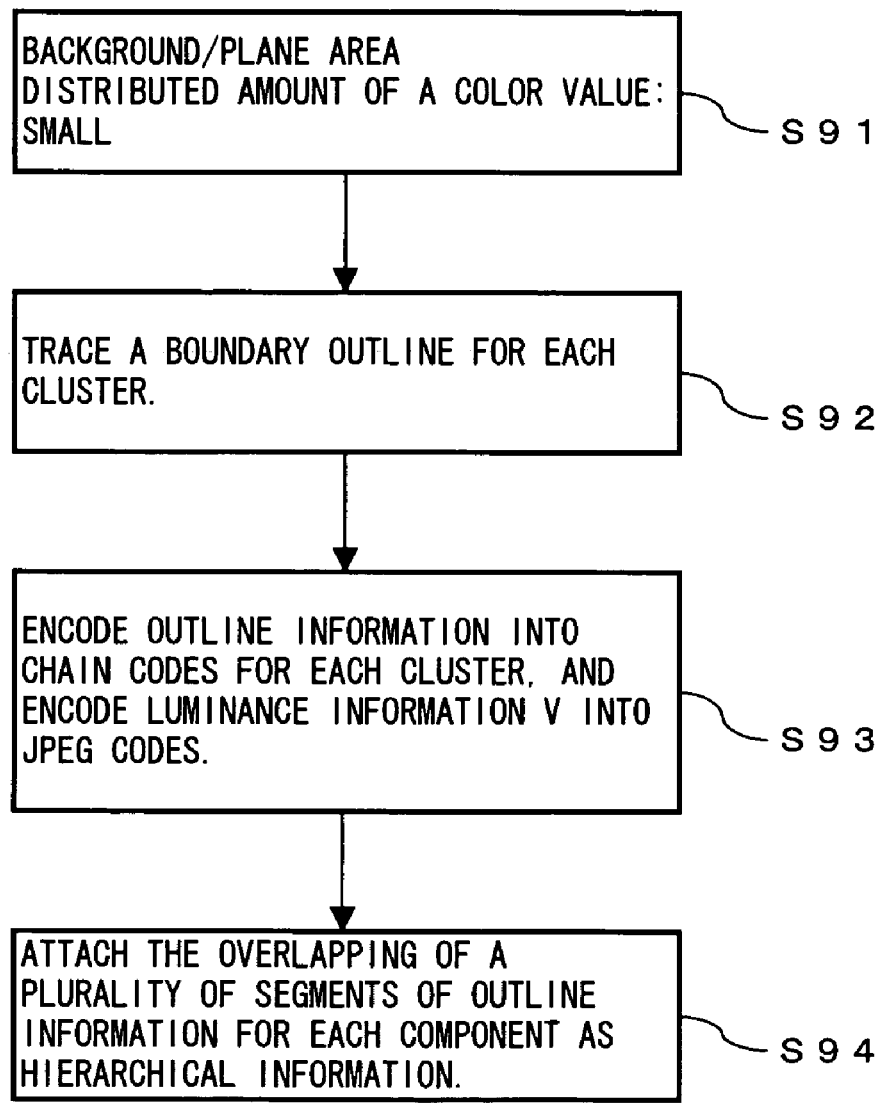
FIG. 17 is a flowchart showing background/plane area encoding process.

FIG. 17 is a flowchart showing the encoding process of a background/plane area.

In the area determining process of step S11 shown in FIG. 2, if the distributed amount of a color value of the 64×64 pixel area belonging to the relevant cluster is below the reference value and it is determined that the cluster belongs to a background/plane area (S91 in FIG. 17), the outline of its boundary with another cluster for each cluster is traced (S92 in FIG. 17).

Then, outline information is encoded into chain codes for each cluster, and the luminance information V of the relevant cluster is encoded into JPEG codes (S93 in FIG. 17).

Then, the overlapping of outline information between a background/plane area and another component is detected, and hierarchical information indicating the hierarchical position of each component is attached (S94 in FIG. 17).

Figure 18A:
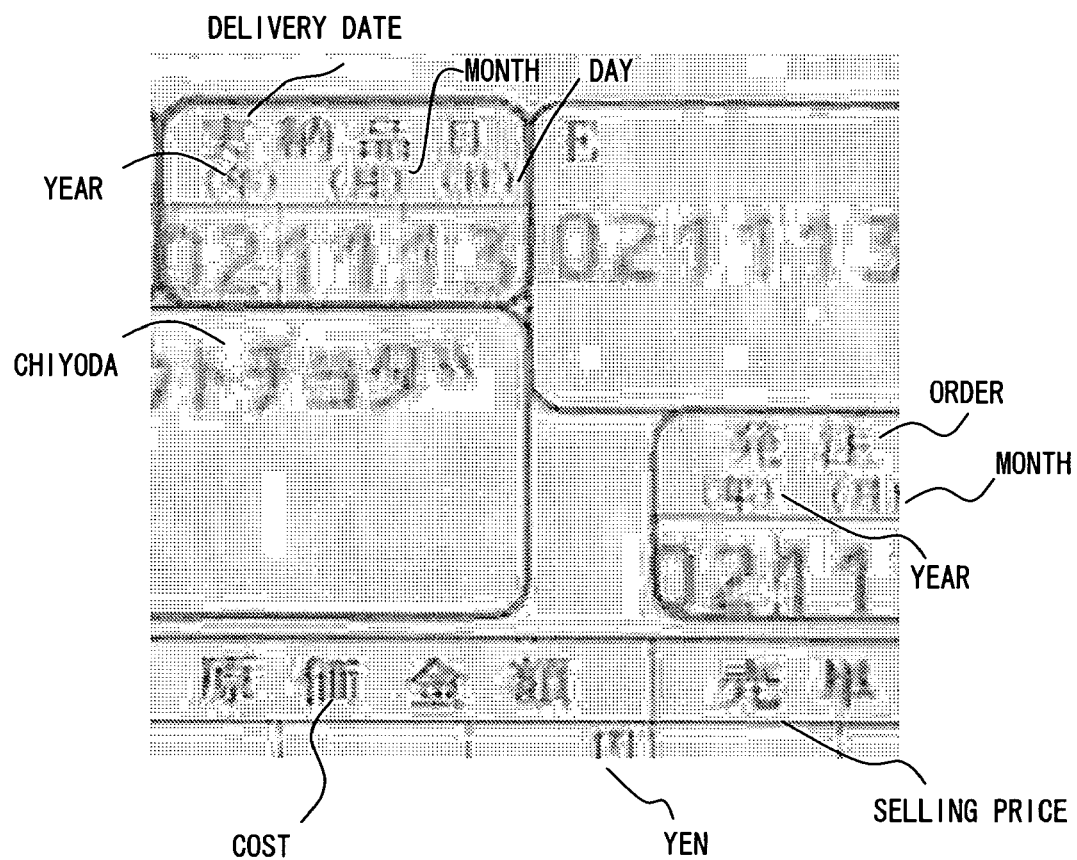
FIGS. 18A and 18B show compressed images.
Figure 18B:
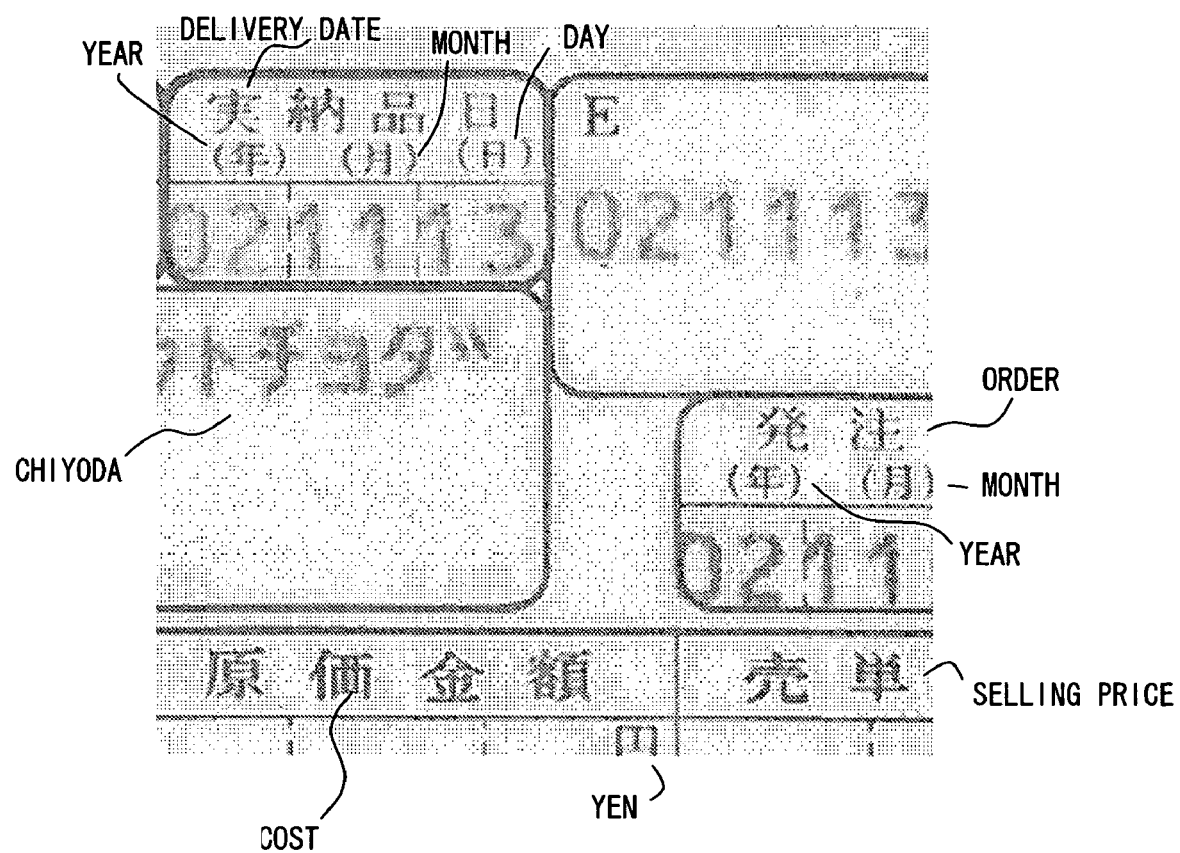

FIGS. 18A and 18B show the compressed image of a slip compressed by JPEG coding and the compressed image compressed by the image compressing method of this preferred embodiment, respectively.

The image compressed by the conventional JPEG coding shown in FIG. 18A, has color deviation in the outlines of ruled lines, preprinted characters, such as "COST (原価金額)", "ORDER (発注)" (printed in red), etc., a character "チヨタ" inputted by a user, a figure "0211" of an ordered date (printed in blue) and the like, and the outlines of the characters become unclear.

However, the image compressed by the compression method in the preferred embodiment of the present invention has hardly any color deviation in the outlines of ruled lines, pre-printed characters, "COST (原価金額)", "ORDER (発注)" and a figure "0211" of an ordered date inputted by a user, and their outlines are also clear.

By drawing near the hue of an original manuscript by reducing the number of hue values and compressing pixels in a character area and pixels in a ruled line area, for example, by Huffman coding and chain coding, respectively, a compressed image, the outlines of whose characters and ruled lines are clear, can be obtained.

According to the above-mentioned preferred embodiments, by generating the hue histogram of each pixel in a color image and reducing the number of hue values, based on the hue histogram, pixels can be classified into clusters each corresponding to the character area, ruled line area or the like of an original manuscript. Furthermore, by determining which of, a character area, a ruled line area or a background/plane area each cluster belongs to and compressing the pixels by a compression method suitable for each area, the compression ratio of data can be improved, and a compressed image, the outlines of whose characters and ruled lines are clear, can be obtained. Thus, the storage capacity needed to store a compressed image can be reduced compared with the conventional compression method.

Here, one hardware configuration of a data processing device with the above-mentioned color image compressing function is described with reference FIG. 19.

A CPU 51 executes an image compressing process. In an external storage device 52, programs, such as OS, etc., compressed data and the like are stored. Memory 53 is used for a variety of tables used for the operation or as an area storing data temporarily.

A storage medium driving device 54 reads or writes a portable storage medium 55, such as a CD-ROM, a DVD, a flexible disk, an IC card or the like.

For an input device 56, a keyboard or the like is used, and the device 56 inputs data. For an output device 57, a display or the like is used.

A network connecting device 58 is used to connect a network, such as LAN, the Internet or the like, and through this device 58, messages can be collected from service servers on the network. The CPU 51, memory 53 external storage device 52 and the like are connected with each other by a bus 59.

The present invention is not limited to the above-mentioned preferred embodiments, and it can also be configured as follows.

Although in the above-mention preferred embodiments, a color image including a photograph area is compressed, the present invention can also be applied to the compression of documents not including a photograph area but including ruled lines and characters, and the like. In that case, a rule line area and a character area are distinguished based on the features of the outline of each cluster, and each of the ruled line area and character area is encoded by a coding method suitable for the respective area. In that case, too, by reducing the number of hue values, the data compression ratio can be improved when encoding image data. Since a character area can be compressed by an encoding method suitable for the encoding of characters (for example, Huffman coding), compared with JPEG coding or the like, its compression ratio can be improved and a compressed image the outlines of whose ruled lines and characters are clear, can be obtained.

The coding method of each area is not limited to the Huffman coding, chain coding and JPEG coding mentioned in the preferred embodiments, and another publicly known coding method suited to compress a character, a ruled line and the like can also be used.

According to the above-mentioned preferred embodiment, by allocating a hue value lower than that of a color image read by an optical sensor to each pixel and classifying the pixels of the entire color image into clusters, based on the hue value, the number of clusters whose characteristic must be determined can be reduced. Then, by determining the characteristic of each cluster and encoding by a coding method suitable for the characteristic of each cluster, its compression ratio can be improved and a compressed image, the outlines of whose characters and ruled lines are clear, can be obtained.

By determining an area, such as a photograph area, a ruled line/character area, a background area or the like, based on both the distributed amount of a color value and distributed amount of a hue of a pixel, can be accurately determined. Furthermore, by allocating a hue value fewer than that of a read color image, to each pixel and classifying the pixels of the entire color image, based on the hue value, the number of clusters whose characteristic must be determined, can be reduced. Then, by encoding by a coding method suitable for the characteristic of the determined cluster, its compression ratio can be improved, and a compressed image, the outlines of whose characters and ruled lines are clear, can be obtained.

What is claimed is:

1. A color image compression method for compressing color images read by an optical sensor, comprising:

dividing a color image into a plurality of areas and determining a characteristic of each area, based on both a distributed amount of a color value and a distributed amount of a hue value of a pixel in each area, upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

counting the number of appearances of the hue value of each pixel of a color image, generating a hue histogram of pixels in other than a photograph area and storing the hue histogram in a storage unit;

reducing the number of hue values of the entire color image to obtain a number-reduced hue value, based on the hue histogram, allocating the number-reduced hue value to each pixel and classifying the pixels of the entire color image into clusters, based on the newly allocated hue value; and determining a characteristic of each of the clusters and encoding pixels in each cluster of the clusters by a coding method suitable for the characteristic of each of the clusters.

2. The color image compressing method according to claim 1, wherein it is determined whether the characteristic of each of the clusters is a ruled line area or a character area, based on the features of an outline of each of the clusters, and each of the clusters determined to belong to the ruled line area and each of the clusters determined to belong to the character area is encoded by a coding method suitable for the characteristic of the respective area.

3. The color image compressing method according to claim 1, wherein a color image is divided into a plurality of areas, both a distributed amount of color values and a distributed amount of hue values are calculated and it is determined which of each area is, a photograph area, a ruled line/character area or a background area, based on both the distributed amount of color values and distributed amount of hue values, and the outline of each of the clusters is traced and it is determined whether or not a number of change points at which the direction of traced outline changes exceeds a specific value, if the number of change points is below the specific value, it is determined that the area is a ruled line area and if the number of change points exceeds the specific value, it is determined that the area is a character area.

4. The color image compressing method according to claim 1, wherein if the distributed amount of color values exceeds a first reference value and the distributed amount of hue values is below a second reference value, it is determined whether or not the height and width of the outermost circumscribed rectangle exceed respective reference values, then, if the height and width exceed the reference values, it is determined that the area is a ruled line area, and if the height and width are below the reference values, the outline of boundary with another cluster is traced, and it is determined whether or not a number of change points at which the direction of the traced outline changes exceeds a specific value, if the number of change points is below the specific value, it is determined that the area is a ruled line area and if the number of change points exceeds the specific value, it is determined that the area is a character area.

5. The color image compressing method according to claim 1, wherein pixel data of a ruled line area is compressed by chain coding, and pixel data of a character area is compressed by Huffman coding.

6. The color image compressing method according to claim 2, wherein pixel data of a ruled line area is compressed by chain coding, pixel data of a character area is compressed by Huffman coding, outline data of a background area is compressed by chain coding and luminance information of the background area is compressed by JPEG coding.

7. A color image compressing method for compressing color images read by an optical sensor, comprising:

dividing a color image into a plurality of areas and determining a characteristic of each area, based on both a distributed amount of a color value and a distributed amount of a hue value of a pixel in each area, upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

counting the number of appearances of the hue value of each pixel of a color image, generating a hue histogram and storing the hue histogram in a storage unit;

reducing the number of hue values of the entire color image to obtain a number-reduced hue value, based on the hue histogram, allocating the number-reduced hue value to each pixel and classifying the pixels of the entire color image into clusters, based on the newly allocated hue value; and determining a characteristic of each of the clusters and encoding pixels in each of the clusters by a coding method suitable for the character of each of the clusters, wherein HSL conversion is applied to RGB data of pixels in other than a photograph;

a color hue histogram is generated by counting number of appearances of a value of each hue H of each color pixel;

a monochrome hue histogram is generated by counting number of appearances of a value of each luminance L of each color pixel;

both a color hue peak list and a monochrome hue peak list are generated by detecting a predetermined number of higher-ranked hue values in each of the color hue histogram and monochrome histogram;

a typical hue value list of the entire color image is generated by overlapping the color hue histogram and monochrome hue histogram of each area;

a color list is generated by allocating a corresponding hue value of the typical hue value list to each color pixel in the color image, counting the number of appearances of the hue value allocated to each color pixel and selecting a predetermined number of hue values whose number of appearances is highly ranked;

a monochrome list is generated by allocating a corresponding hue value of the typical hue value list to each monochrome pixel in a color image, counting the number of appearances of the hue value allocated to each monochrome pixel and selecting a predetermined number of hue values whose number of appearances is highly ranked; and one cluster is generated by allocating a corresponding hue value in the color list to each color pixel in the color image, allocating a corresponding hue value in the monochrome list to each monochrome pixel in the color image and unifying adjacent pixels with the same hue value into one cluster and all the areas of the color image are classified into a plurality of clusters.

8. A color image compressing device for compressing a color image read by an optical sensor, comprising:

an area determining unit for dividing a color image into a plurality of areas and determining a characteristic of each area, based on both a distributed amount of a color value and a distributed amount of a hue value of pixels of each area, and upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

a hue histogram generating unit for counting the number of appearances of a hue value of each pixel in a color image and generating a hue histogram of pixels in other than a photograph area;

a cluster classifying unit for reducing the number of hue values of the entire color image to obtain a number-reduced hue value, based on the hue histogram, allocating the number-reduced hue value to each pixel and classifying the pixels of the entire color image into clusters to obtain a newly allocated hue value, based on the newly allocated hue value; and an encoding unit for determining a characteristic of each of the clusters and encoding pixels in each of the clusters suitable for the characteristic of each of the clusters.

9. The color image compressing device for compressing a color image read by an optical sensor, comprising:

an area determining unit for dividing a color image into a plurality of areas and determining a characteristic of each area, based on both a distributed amount of a color value and a distributed amount of a hue value of a pixel in each area, upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

a hue histogram generating unit for counting the number of appearances of a hue value of each pixel in a color image;

a cluster classifying unit for reducing the number of hue values of the entire color image, based on the hue histogram to obtain a number-reduced hue value, allocating the number-reduced hue value to each pixel and classifying the pixels of the entire color image into clusters, based on the newly allocated hue value;

an encoding unit for determining a characteristic of each of the clusters and encoding pixels in each of the clusters suitable for the characteristic of each of the clusters;

a hue peak list generating unit for generating a color hue peak list and a monochrome hue peak list by detecting a predetermined number of higher-ranked hue values in each of the color hue histogram and monochrome histogram, respectively;

a typical hue value list generating unit for generating a typical hue value list of the entire color image by overlapping the color hue histogram and monochrome hue histogram of each area; and a color and a monochrome list generating unit for generating a color list by allocating a corresponding hue value of the typical hue value list to each color pixel in the color image, counting the number of appearances of the hue value allocated to each color pixel and selecting a predetermined number of hue values whose number of appearances is highly ranked and generating a monochrome list by allocating a corresponding hue value of the typical hue value list to each monochrome pixel in a color image, counting the number of appearances of the hue value allocated to each monochrome pixel and selecting a predetermined number of hue values whose number of appearances is highly ranked; wherein the hue histogram generating unit applies HSL conversion to RGB data of pixels in other than a photograph area, generates a color hue histogram by counting the number of appearances of a value of each hue H of the pixels and generates a monochrome hue histogram by counting the number of appearances of a value of each luminance L of the pixels;

the cluster classifying unit generates one cluster by allocating a corresponding hue value in the color list to each color pixel in the color image, allocates a corresponding hue value in the monochrome list to each monochrome pixel in the color image and unifies adjacent pixels with the same hue value into one cluster and all the areas of the color image into a plurality of clusters.

10. A computer-readable storage medium on which is recorded a program for enabling a computer to compress a color image read by an optical sensor, said process comprising:

dividing a color image into a plurality of areas and determining the relevant area, based on both a distributed amount of color value and a distributed amount of hue value of each area, upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

counting the number of appearances of the hue value of each pixel in a color image and generating a hue histogram of pixels in other than a photograph area;

reducing the number of hue values of the entire color image to obtain a number-reduced hue value, based on the hue histogram, allocating the number-reduced hue value to each pixel and classifying pixels of the entire color image into clusters, based on the newly allocated hue value; and determining a characteristic of each of the clusters and encoding pixels in each of the clusters by a coding method suitable for the characteristic of each of the clusters.

11. A color image compressing device for compressing a color image read by an optical sensor, comprising:

dividing means for dividing a color image into a plurality of areas and determining a characteristic of each area, based on both a distributed amount of a color value and a distributed amount of a hue value of a pixel in each area, and upon calculating the distributed amount of the color value and the distributed amount of the hue value of each area of a color image, if the distributed amount of the color value exceeds a first reference value and the distributed amount of the hue value exceeds a second reference value, it is determined that the area is a photograph area; if the distributed amount of the color value exceeds the first reference value and the distributed amount of the hue value is below the second reference value, it is determined that the area is a ruled line area or a character area; and if the distributed amount of the color value is below the first reference value, it is determined that the area is a background/plane area;

hue histogram generating means for counting a number of appearances of a hue value of each pixel in a color image;

cluster classifying means for reducing the number of hue values of the entire color image to obtain a number-reduced hue value, based on the hue histogram, allocating the number-reduced hue value to each pixel and classifying the pixels of the entire color image into clusters to obtain a newly allocated hue value, based on the newly allocated hue value; and encoding means for determining a characteristic of each of the clusters and encoding pixels in each of the clusters suitable for the characteristic of each of the clusters.

* * * * *